United States Patent
Kohzuki et al.

(10) Patent No.: US 6,657,964 B1
(45) Date of Patent: Dec. 2, 2003

(54) TERMINAL WITH BANDWIDTH CONTROL FUNCTION

(75) Inventors: Kiyoshi Kohzuki, Ebina (JP); Takeki Yazaki, Kokubunji (JP); Takeshi Aimoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/315,820

(22) Filed: May 21, 1999

(30) Foreign Application Priority Data

May 26, 1998 (JP) .......................................... 10-161332

(51) Int. Cl.[7] .............................................. H04L 12/26
(52) U.S. Cl. ................................. 370/236.1; 370/395.43
(58) Field of Search ................................. 370/229, 231, 370/232, 235, 236, 236.1, 236.2, 241, 252, 253, 351, 389, 395.1, 396, 397, 395.4, 395.41, 395.42, 395.43, 410, 412, 431, 437, 465, 468, 901, 902, 904, 905, 912

(56) References Cited

U.S. PATENT DOCUMENTS 5,784,358 A * 7/1998 Smith et al. ................. 370/230
6,404,767 B1 * 6/2002 Depelteau et al. ........ 370/236.1
6,449,253 B1 * 9/2002 Ott .............................. 370/231

* cited by examiner

Primary Examiner—William A. Luther
(74) Attorney, Agent, or Firm—Antonelli, Terry, Stout & Kraus, LLP

(57) ABSTRACT

A terminal with a shaper comprising an ABR bandwidth calculator for calculating a shaping bandwidth from congestion notification information in each received RM cell and a bandwidth allocator for calculating bandwidths allocated between respective connections with the bandwidths given priorities, wherein cells are transmitted with one small in value, of the result of calculation by the ABR bandwidth calculator and the result of calculation by the bandwidth allocator as a shaping bandwidth. With respect to connections subjected to a limitation of each shaping bandwidth by the congestion notification information, the priority for bandwidth allocation is lowered so that the bandwidths unavailable to the connections are deallocated to other connections.

14 Claims, 18 Drawing Sheets

FIG. 11

| | ESTIMATED SENDING TIME (4131) | CELL INTERVAL (4130) |
|---|---|---|
| CONNECTION 1 | 1210 | 10.0 |
| CONNECTION 2 | 1300 | 7.5 |
| ⋮ | ⋮ | ⋮ |
| CONNECTION n | 1220 | 5.0 |

FIG. 12

| | SHAPING BANDWIDTH (4230) | MCR (4231) | PCR (4232) | RIF (4233) | RDF (4234) |
|---|---|---|---|---|---|
| CONNECTION 1 | 15M | 3M | 150M | 1/16 | 1/16 |
| CONNECTION 2 | 20M | 10M | 150M | 1/32 | 1/8 |
| ⋮ | ⋮ | ⋮ | ⋮ | ⋮ | ⋮ |
| CONNECTION n | 30M | 0 | 40M | 1/32 | 1/4 |

FIG. 13

| | WEIGHT (4331) | PRIORITY (4330) |
|---|---|---|
| CONNECTION 1 | 6 | 12 |
| CONNECTION 2 | 8 | 8 |
| ⋮ | ⋮ | ⋮ |
| CONNECTION n | 12 | 16 |
| SURPLUS BANDWIDTH FOR ABR) = | 120M | (4332) |
| SUM OF WEIGHT = | 48 | (4333) |

TERMINAL WITH BANDWIDTH CONTROL FUNCTION

BACKGROUND OF THE INVENTION

1. Field of the Invention

The present invention relates to a terminal suitable for use in an asynchronous transfer mode network and a variable-length packet network, and particularly to a technique for allocating shaping bandwidths between respective users.

2. Description of the Related Art

An asynchronous transfer mode technique has been widely known as a communication technique which is capable of supporting various types of traffics such as speech, images, data, etc. with efficiency using fixed-length packets called "cells" and suitable for multimedia communications. The asynchronous transfer mode technique has been described in, for example, "The ATM Forum TM4.0" (Prior Art 1).

FIG. 2 show a general network comprised of a plurality of terminals and switches. In the case of an asynchronous transfer mode network, however, cells are transferred through virtual paths called "connections" as described in "2. ATM Service Architecture (p.4)" of the Prior Art 1. When each cell is transferred from one terminal 10 (hereinafter called "source terminal or source end system") to another terminal 20 (hereinafter called "destination terminal or destination end system") in FIG. 2, virtual paths (connections) are established between the source terminal 10, switches 30, 31, 32 and destination terminal 20. The cells are transferred over the connections which connect between both the terminals 10 and 20. As the establishment of the connections, there are two cases: one required by a source terminal and another required by a terminal 15 for network management.

In the multimedia communications, a burst traffic for communicating data and a real-time traffic for communicating signals, such as speech, picture or the like, are simultaneously transferred through different connections lying within the same line. When connections incoming from a plurality of input lines merge with each other at one of output ports of a switch, it is required to carry out cell transmission control (i.e., traffic control) on individual connections. As to the real-time traffic, each bandwidth for use in the transfer of signals, such as speech, picture or the like, can be estimated in advance. In order to reserve a necessary bandwidth (hereinafter called "shaping bandwidth") within a cell communication path before the commencement of cell transmission and perform low-delay transmission within such a reserved bandwidth, real-time traffic cells are transmitted preferentially to burst traffic cells forwarding to the same output port.

A cell sending apparatus needs to transmit output cells in the secured shaping bandwidth. For this purpose, it is necessary to provide the function of sending cells in a reserved bandwidth for each connection. The cell sending function in this reserved bandwidth will hereinafter be called "shaping".

A shaping apparatus or a shaper has been disclosed in, for example, Japanese Unexamined Patent Publication No. Hei 6-315034, "Cell Flow Control Device and ATM Communication Network" (Prior Art 2). The "Cell Flow Control Device" in the Prior Art 2 is the same meaning as the shaper. In the Prior Art 2, the shaping apparatus is constructed as shown in FIG. 3. The shaper 7 comprises a policing part 2 for determining whether an incoming cell interval falls within a prescribed allowable value, a cell sending time arithmetic part 3 for calculating the output time of each cell, a memory 4 for temporarily storing each cell therein, a write control circuit 5 for writing cells into the memory 4, and a read control circuit 6 for reading out the stored cells from the memory 4. Even when the incoming cells are received in a bandwidth higher than the sending bandwidth, since these cells are temporarily stored in the memory 4, these cells can be transmitted maintaining the contracted shaping bandwidth.

The shaping is also required to the burst traffic cells other than the real-time traffic cells. In the case of the burst traffic data communication, the shaping bandwidth cannot be estimated in advance. However, since reducing a transmission delay is not so important in the burst traffic data, the source terminal may start cell sending without ensuring the shaping bandwidth. Even if traffics are concentrated on one of nodes or a network congestion has occurred on one of output lines, high availability of the network may be realized by temporarily storing incoming cells in buffers provided within the network. However, if the amount of cells flow into the network in excess of the ability of the network to process the cells, the cells overflowed from the buffer must be discarded in the course of their transmission.

In the Prior Art 1, two traffic classes are defined for the data communication traffic from the viewpoint of such cell discard.

One of them is an ABR (Available Bit Rate) class for performing dynamic control on the shaping bandwidth in the network. For this class, a congestion notification cell circulated into the network regularly in order to monitor the state of the congestion of the network (hereinafter called "congestion status") is utilized to decrease the amount of flow of cells into the network upon congestion and increase the amount of flow of cells upon non-congestion, so that cell transfer is smoothly performed without causing cell discard. A model for the ABR class has been described in, for example, "5.10 ABR Flow Control (p.44)" in the Prior Art 1. Another class is a UBR (Unspecified Bit Rate) class. In this class, emphasis is laid on effective use of available bandwidth. Even if a network is placed in a congestion status and brought to a state of causing cell discard, no limitation is imposed on the shaping bandwidth.

In the Prior Art 1, as shown in the model for ABR control in FIG. 4 (see FIG. 2-1 in the Prior Art 1), one of switches 30 through 33 or destination terminal 20 having detected the congestion of the network sets a congestion notification bit in a congestion notification cell circulated into each connection to "1". When the source terminal 10 receives the congestion notification cell whose congestion notification bit is set to "1", it determines that the network is congested, and thereby decreases the transmission bandwidth to prevent the flow of excessive cells into the network. If a congestion notification cell whose congestion notification bit is not set to "1", is received, the source terminal 10 determines that the network is not congested, and hence increases the transmission bandwidth to up the availability of the network.

Even when the congestion notification cell whose congestion notification bit is set to "1", is received at this time, it is unnecessary to reduce the cell transmission bandwidth to a bandwidth which falls below MCR (Minimum Cell Rate) contracted upon connection setting. The dynamic control on the transmission bandwidth can be performed from the network side by executing feedback control using such a congestion notification cell.

FIG. 4 shows only the flow of data cells in one direction from the source terminal 10 to the destination terminal 20 for simplification. Since, however, an actual terminal apparatus performs both operation for the source terminal and operation for the destination terminal, the flow of the data cells from the destination terminal 20 to the source terminal 10 also exists. The above-described one-direction communication model will be explained unless otherwise specified.

In the Prior Art 1, the congestion notification cell is called "RM cell (Resource Management Cell)". One transferred from the source terminal to the destination terminal is referred to as "forward RM cell", and one transferred from the destination terminal to the source terminal is called "backward RM cell". In the following description, the forward RM cell and the backward RM cell are referred to as FRM cell and BRM cell in accordance with the above designations. A distinction between the FRM cell and the BRM cell is made according to a bit (DIR bit) indicative of a transfer direction, lying in the RM cell. Namely, a cell with DIR=0 is determined as the FRM cell, whereas a cell with DIR=1 is determined as the BRM cell.

According to the description in "5.10 ABR Flow Control" of the Prior Art 1, the control on a shaping bandwidth based on congestion notification information for the RM cell is intended for the case in which a bandwidth calculating source terminal is defined as a starting point of a single connection. No mention is made of the case in which a source terminal is defined as a starting point for a plurality of connections. When a source terminal serves as a starting point for the plurality of connections, it is important to equally allocate the bandwidth of a communication path to respective connections or to preferentially assign the bandwidth to important connections regardless of whether the feedback control using the RM cell is being performed (ABR class) or not (UBR class).

The fairness of bandwidth allocation has been described in, for example, "Informative Appendix I.3 Example Fairness Criteria (p.82)" of the Prior Art 1. In the "Informative Appendix I.3 Example Fairness Criteria" of the Prior Art 1, "Max-Min, MCR plus equal share" for equally dividing the bandwidth by all connections, and "Weight allocation" for performing weighting every connections, etc. are defined as fairness criteria.

For the ABR class, an ERICA method is known as one means for implementing the equal share of the bandwidths for the communication path. The ERICA method has been described in, for example, "Informative Appendix I.5 Example Switch Mechanism (p.85)" of the Prior Art 1. According to the ERICA method, a switch or a destination terminal within a network notifies to a source terminal such a value as a shaping allowed bandwidth that is obtained by equally dividing the bandwidth of each communication path inputted to the switch or the destination terminal. Using the ERICA method, it possible to perform equal division of the bandwidths for the communication path. "Packet Scheduling Device" described in Japanese Unexamined Patent Publication No. Hei 9-83547 is known as a Prior Art 3. According to the Prior Art 3, a shaping apparatus, which supports a plurality of connections for UBR class, has a plurality of first queues prepared one for each connection and a second queue for storing elements indicative of access order of the first queues. Transmission cells are read out from the first queues according to the indication of an element read out from the second queue. The second queue can store a limited number of elements equal to the number corresponding to the weight of a transmission ratio between the respective connections. The Prior Art 3 can control the rate of transmission cells of a plurality of connections for UBR class.

Further, an ABR control technique using VS/VD (Virtual Source/Virtual Destination) for a long distance connection extending from a source terminal to a destination terminal has been disclosed in "115.10.7 Virtual Source and Virtual Destination" of the Prior Art 1.

Since the long-distance connection needs time until congestion notification information is notified to the source terminal and the shaping bandwidth is reduced in controllability, a path defined between a source terminal 11 and a destination terminal 21 is divided by a VS/VD 60 provided on its way as shown in FIG. 5 (FIG. 5-5 in the Prior Art 1) in order to prevent the congestion notification from being delayed due to the long distance. The VS/VD allows each data cell to pass therethrough as it is. With respect to the transmission and reception of RM cells, the VS 40 performs the same operation as that of the source terminal 11 and the VD 50 performs the same operation as that of the destination terminal 21.

Three types of embodiments shown below are known as configurations for VS/VD. Namely, they area configuration for the node 60 independent of others as shown in FIG. 5, a configuration in which VS/VD is placed in a line interface unit of a switch 35 as shown in FIG. 6, and a configuration in which VS/VD is provided as a trunk attached to a switch 36 as shown in FIG. 7.

As to VS/VD, for example, "ATM WAN architecture for implementation of multi protocol, part 1" is described in The Institute of Electronics, Information and Communication Engineers Technical Report SSE95-186 (1996–03) (Prior Art 4). The Prior Art 4 has proposed a system for applying VD/VD to an actual network and introducing an ABR class at low cost and shows a necessary buffer amount or the like.

Further, Japanese Unexamined Patent Publication No. 10-215253 (Prior Art 5) discloses to multiplex a plurality of VPC lying on the same path and a shared VPC passing through the same path as for the plurality of VPC in order to supplement the excess and deficiency of bandwidths for VPC by the bandwidth held by the shared VPC, wherein the plurality of VPC are switched by a plurality of ATM nodes located between a starting point and an end point and the shared VPC has a bandwidth to be shared by the plurality of VPC. However, the allocation of shaping bandwidths at a source terminal has not been discussed in the Prior Art 5.

SUMMARY OF THE INVENTION

In the following description, the source terminal and VS of VS/VD are both called "cell source device". The ERICA method of the Prior Art 1 is a method for allocating bandwidths for a communication path connected to the switch or destination terminal. A bandwidth notified to the cell source device does not take into consideration each bandwidth for the communication path connected to the cell source device. In the cell source device which supports a plurality of connections, the total bandwidth calculated and notified by each individual connection ERIC methods might exceed the actual bandwidth of the communication path connected to the cell source device. In this case, cell source device cannot transmit the cells in the notified bandwidth. Further, the cells are not always transmitted to each connection in a bandwidth greater than the above-described MCR (Minimum Cell Rate). It is thus necessary for the cell source device to allocate the bandwidth of the communication path connected to the cell source device to each connection.

According to the Prior Art 3, the cell source device assigns weights to the respective connections and makes it a rule to transmit the cell if a vacant bandwidth exists in an outgoing communication path. Accordingly, the cell source device performs only operation for the UBR class and is not applicable to the ABR class for sending cells while maintaining the specified shaping bandwidth. Further, the cell source device cannot ensure the transmission of cells to each connection in a bandwidth greater than MCR either.

A first object of the present invention is to propose a shaping bandwidth control system suitable for use in a cell source device supporting a plurality of connections, which secures the transmission of cells to each connection in a bandwidth greater than MCR and allocates bandwidths other than MCR to the respective connections at a ratio corresponding to the priorities of the respective connections.

In the ABR class, the cell source device must send cells in a bandwidth less than the notified value when the cell source device is notified through the RM cell that the network is congested. The cell source device allocates the bandwidth of a communication path to respective connection on the communication path so that the total of the bandwidths assigned to these connections equals to the bandwidth of the communication path. In this situation, if the cell source device is notified from the network of a bandwidth value for a specified connection which is smaller than a bandwidth originally assigned to the connection, the sum of shaping bandwidths for all the connections becomes smaller than the bandwidth of the communication path connected to the cell source device. Namely, a vacant bandwidth occurs in the bandwidth of the communication path, so that the bandwidth for the communication path cannot be effectively utilized. It is desirable for each connection to release the excessively-assigned bandwidth (bandwidth corresponding to the difference between a bandwidth originally assigned by bandwidth allocation and an actually cell-sending bandwidth) when its shaping bandwidth is reduced by the congestion notification, so that the bandwidth is re-allocated to other connections.

A second object of the present invention is to propose a shaping bandwidth control system suitable for use in a cell source device supporting a plurality of connections, wherein a connection to which a value smaller than a shaping bandwidth assigned by a bandwidth allocation function is notified by a congestion notification sent from a network, releases an excessive bandwidth corresponding to the difference between a bandwidth assigned to the connection and an actual shaping bandwidth of the connection, whereby high availability of the network can be achieved as a whole by re-allocating the released bandwidth to the other connections.

While the increase or decrease in shaping bandwidth based on the congestion notification information at the source terminal has been described in the "15.10 ABR Flow Control (p.44) of the Prior Art 1, the bandwidth allocation for the source terminal has not been described.

A third object of the present invention is to provide a configuration of a source terminal provided with circuits for implementing the shaping bandwidth control described in the first and second objects.

While the concept of VS/VD and the conditions to be met are simply described in the "5.10.7 Virtual Source and Virtual Destination" of the Prior Art 1, no mention is made of a method of specifically configuring VS/VD. Further, only the VS/VD utilizing method is described in the Prior Art 3 and hence this is not related to the configuration of VS/VD.

A fourth object of the present invention is to provide a configuration of VS/VD provided with circuits for implementing the shaping bandwidth control described in the first and second objects.

Further, the shaping and bandwidth allocation is a technique important not only for the ATM cell but also for a general variable-length packet transfer.

A fifth object of the present invention is to provide a shaping bandwidth control system capable of achieving high availability of a network as a whole for a variable-length packet such as an IP (Internet Protocol) packet.

In order to achieve the above objects, there is provided a source terminal according to the present invention, for transferring data cells and congestion notification cells to a destination terminal through a connection within an asynchronous transfer mode network including at least one transit switching system, comprising: shaping bandwidth control means for increasing or decreasing each of shaping bandwidths, based on congestion notification information written into a congestion notification cell sent back from the destination terminal or the transit switching system to the source terminal in a congested status, the shaping bandwidth control means including, memory means for storing therein priority information indicative of priorities for bandwidth allocation at cell transfers for each connection; and shaping bandwidth calculating means for calculating each cell shaping bandwidth, based on the priority information when a plurality of connections are simultaneously placed in a cell transfer state, whereby the shaping bandwidths are allocated between all the connections placed in the cell transfer state.

The shaping bandwidth control means multiplies, for example, a ratio obtained by dividing the priority information for the respective connections by the sum of the priority information for all the connections each placed in the cell transfer state, of connections established over the same line as that for the connections by the shaping bandwidth for the line, thereby calculating a cell shaping bandwidth proportional to the priority information for each connection.

According to one embodiment of the present invention, the shaping bandwidth control means has memory means for storing therein information of minimum secured bandwidth value for each connection, and the shaping bandwidth calculating means includes means for multiplying a ratio obtained by dividing the priority information for the respective connections by the sum of the priority information for all the connections each placed in the cell transfer state, of connections established over the same line as that for the connections by a bandwidth obtained by subtracting minimum secured bandwidths for all the connections to be sent to the line from the shaping bandwidth for the line, and for adding the minimum secured bandwidth value to the obtained result, thereby calculating the cell shaping bandwidth for each connection, whereby the shaping bandwidth control means ensures the minimum secured bandwidth for each connection and allocates the cell shaping bandwidths to the respective connections in proportion to the priority information for the respective connections as bandwidths freely allocable with the respective connections.

There is also provided a source terminal according to the present invention, for transferring data cells and congestion notification cells to a destination terminal through a connection preset within an asynchronous transfer mode network including at least one transit switching system, comprising: shaping bandwidth control means for increasing or decreasing each of shaping bandwidths, based on congestion notification information written into a congestion notification cell sent back from the destination terminal or the transit switching system to the source terminal in a congested status, the shaping bandwidth control means including, memory means for storing therein priority information indicative of priorities for bandwidth allocation at cell transfers for each connection; and means for multiplying a ratio obtained by dividing a minimum secured bandwidth for each connection by the sum of minimum secured bandwidths for all connections each placed in a cell transfer state, of connections established over the same line as the connections by a shaping bandwidth for the line thereby allocating cell shaping bandwidths to the respective connections in proportion to a shaping bandwidth desired to be ensured as the minimum.

There is further provided a source terminal according to the present invention, for transferring data cells and congestion notification cells to a destination terminal through a connection preset within an asynchronous transfer mode network including at least one transit switching system, comprising: shaping bandwidth control means for decreasing a cell shaping bandwidth when a congestion notification bit is set to a congestion notification cell sent back from the destination terminal or the transit switching system to the source terminal, and increasing the cell shaping bandwidth when the congestion notification bit is not set thereto, the shaping bandwidth control means including, means for dividing each cell shaping bandwidth for one line by the number of connections each established over the line and placed in a cell transfer state when a plurality of the connections are simultaneously placed in the cell transfer state, thereby uniformly allocating the cell shaping bandwidth to each connection.

According to one embodiment of the present invention, the shaping bandwidth control means includes memory means for storing therein information of minimum secured bandwidth value for each connection, and means for dividing a bandwidth obtained by subtracting the sum of minimum secured bandwidths for all the connections, sent to one line from a shaping bandwidth for the line by the number of the connections each established over the line and placed in the cell transfer state, and further adding the minimum secured bandwidths for the connections to the obtained result of division, thereby ensuring the minimum secured bandwidth for each connection and uniformly allocating the cell shaping bandwidths to the respective connections as the bandwidths freely allocable with the respective connections.

There is still further provided a source terminal according to the present invention, for transferring data cells to a destination terminal through a connection preset within an asynchronous transfer mode network including at least one transit switching system, comprising: memory means for storing therein priority information indicative of priorities for bandwidth allocation at cell transfers for each connection; and shaping bandwidth calculating means for calculating cell shaping bandwidths proportional to the priority information when a plurality of connections are simultaneously placed in a cell transfer state, whereby the shaping bandwidths are allocated to all the connections each placed in the cell transfer state.

Said shaping bandwidth calculating means may be replaced by means for multiplying a ratio obtained by dividing priority information for the respective connections by the sum of the priority information for all the connections each established over the same line and placed in the cell transfer state by the shaping bandwidth for the line, thereby calculating cell shaping bandwidths proportional to the priority information for each connection.

There is still further provided a source terminal according to the present invention, for transferring data cells to a destination terminal through a connection preset within an asynchronous transfer mode network including at least one transit switching system, comprising: means for dividing, when a plurality of connections are simultaneously placed in a cell transfer state, a shaping bandwidth for the same line as for the connections by the number of the connections each placed in the cell transfer state, of connections established over the line for transmission, thereby uniformly allocating cell shaping bandwidths to the respective connections.

When the cells cannot be transmitted in each cell shaping bandwidth calculated by the shaping bandwidth calculating means because the congestion of the network is notified by the congestion notification cell or there are no cells to be sent, bandwidth allocation calculations may be done using allocated bandwidth information with the priority information as the maximum value as an alternative to the priority information used in the shaping bandwidth calculating means.

When the cells cannot be transmitted in the cell shaping bandwidth calculated in accordance with the cell shaping bandwidth calculation due to the above-mentioned reason, the bandwidth allocation calculations may be done using allocated bandwidth information with a minimum secured bandwidth as the maximum value, as an alternative to the minimum secured bandwidth used in the allocation calculations of each cell shaping bandwidth.

According to one embodiment of the present invention, the source terminal has means for comparing in parallel shaping bandwidths obtained by performing the bandwidth allocation calculations on respective values of candidates selectable as allocated bandwidth information in parallel and shaping bandwidths calculated based on congestion notification information, thereby obtaining the optimum allocated bandwidth information.

One feature of the present invention is that each of network nodes placed in an asynchronous transfer mode network which is comprised of a source terminal, one or a plurality of transit switching systems and a destination terminal and which transfers data cells and congestion notification cells from the source terminal to the destination terminal through a pre-set connection, includes means (A) for decreasing a cell shaping bandwidth when a congestion notification cell produced by each own node is sent back with a congestion notification bit set thereto and increasing the cell shaping bandwidth when the congestion notification cell is sent back without the setting of the congestion notification bit thereto, means (B) for, when a congestion notification cell produced by another node is received, writing information indicative of a buffer congestion status of each connection related to the congestion notification cell into the congestion notification cell and sending it back to a communication path having received the congestion notification cell, and the above-described shaping bandwidth control means (C).

The above-described means (A), (B) and (C) may be provided in a line interface of the transit switching system constituting the asynchronous transfer mode network, or a trunk. Incidentally, the calculation of each cell shaping bandwidth referred to above can be done by software in the source terminal, the network nodes or the transit switching system. Further, information (priority information or the like) defined as a criterion for bandwidth allocation for each connection, which is necessary for the source terminal, the network nodes or the transit switching system, can be set from a network management device connected to the asynchronous transfer mode network.

Typical ones of various inventions of the present inventions have been shown in brief. However, the various inventions of the present application and specific configurations of these inventions will be understood from the following description.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 11 is a table showing a storage format of a cell sending interval memory;

FIG. 12 is a table illustrating a storage format of a shaping information memory;

FIG. 13 is a table depicting a storage format of a priority memory;

DETAILED DESCRIPTION OF THE PREFERRED EMBODIMENTS

EMBODIMENT 1

Figure 1:
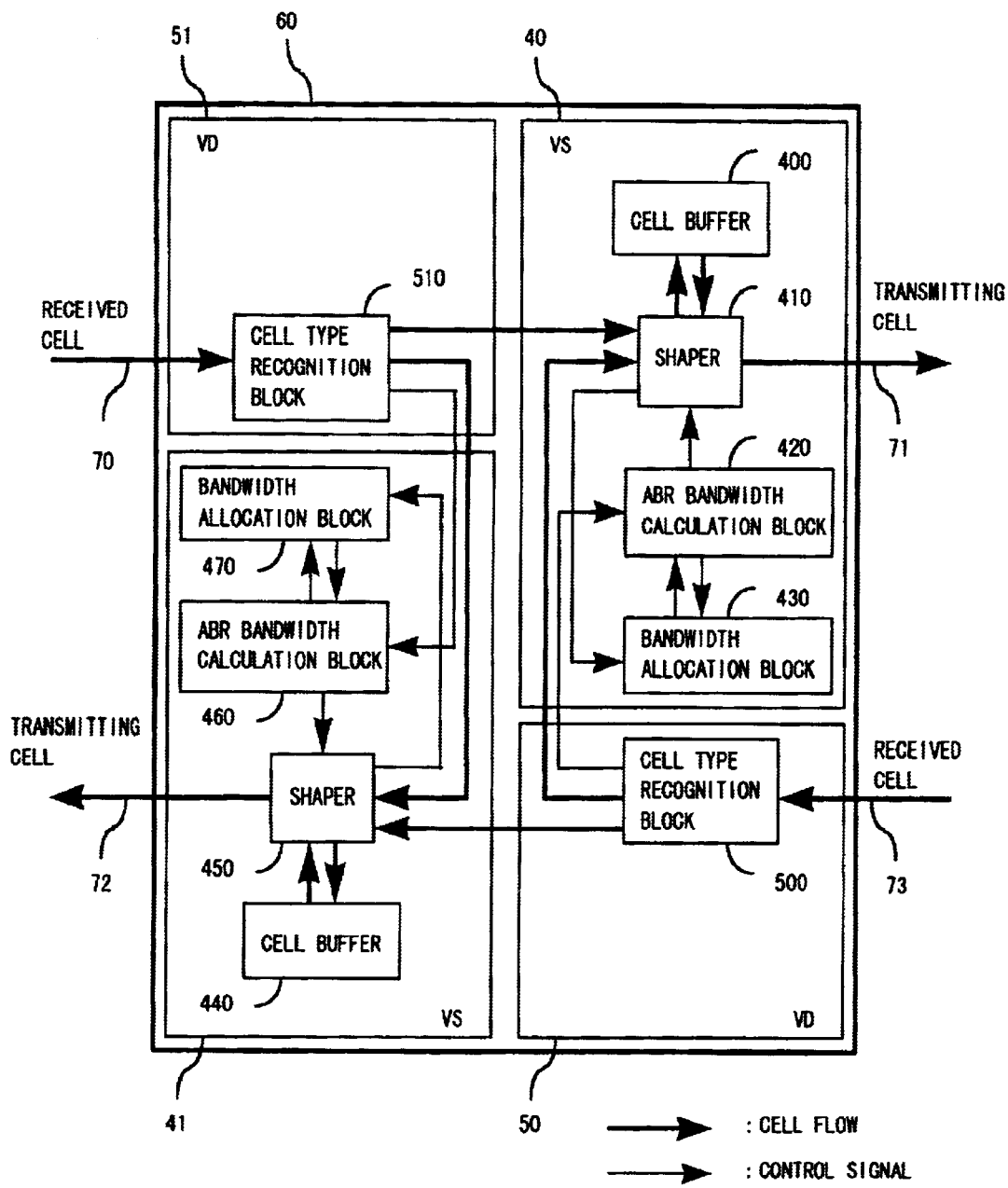
FIG. 1 is a block diagram showing a configuration of one embodiment in which the present invention is applied to VS/VD.

An example in which the present invention is applied to VS/VD, will be explained in detail with reference to FIG. 1 as a first embodiment.

The VS 40 comprises a cell buffer 400 for storing each transmit-wait cell therein, a shaper 410 for controlling a shaping bandwidth, and reading out the stored cells from the cell buffer 400 to send them out to a communication path 71, an ABR bandwidth calculation block 420 for calculating a shaping bandwidth based on congestion notification information in a received BRM cell and renewing an interval for transmitting the cell from the shaper 410, and a bandwidth allocation block 430 for calculating each individual bandwidths obtained by allocating a surplus bandwidth for ABR with each individual active connections (connections in which cells are actually being transmitted). The cell buffer 400 can be implemented by an externally-provided memory and its control circuit, for example.

Figure 9:
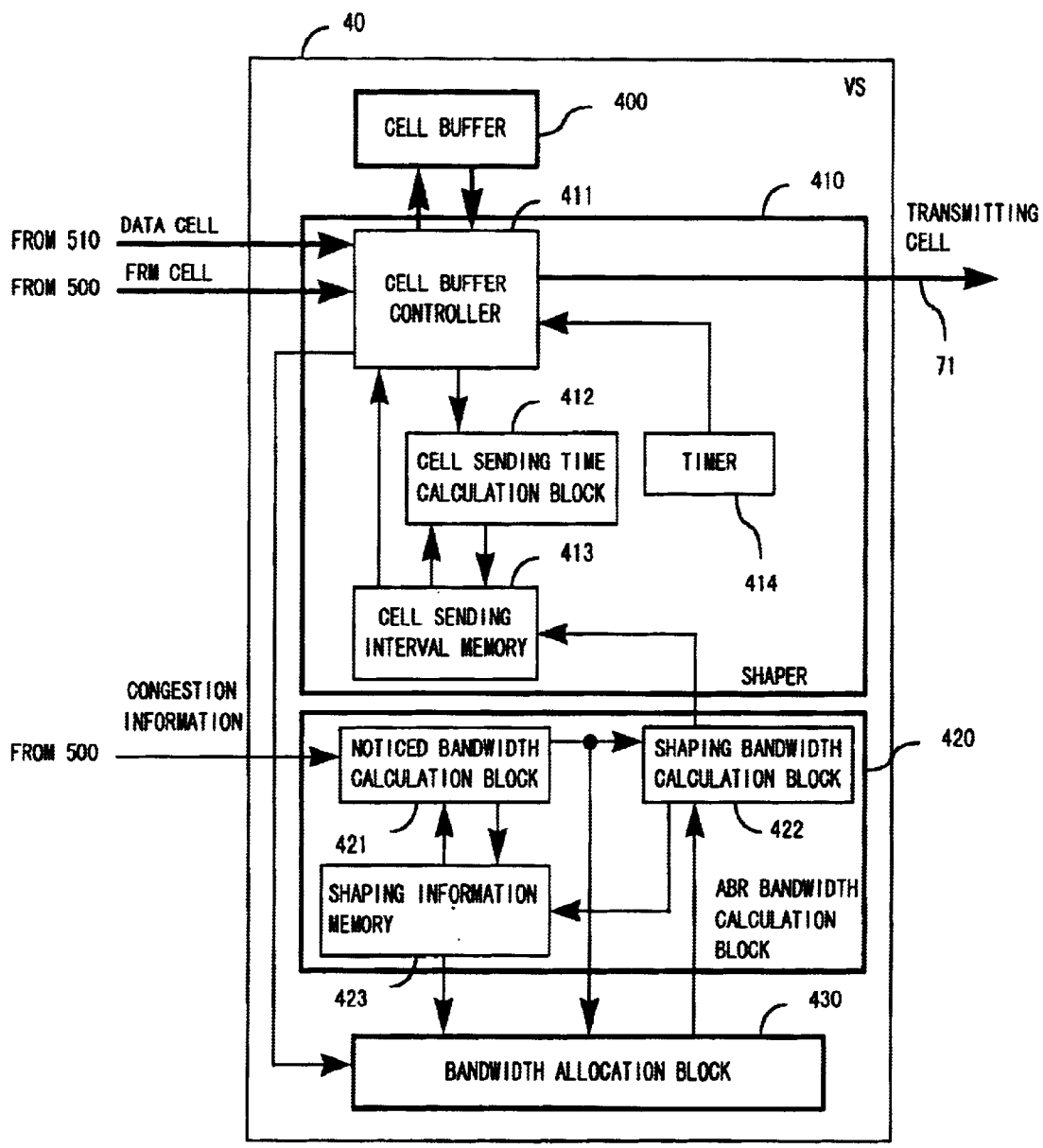
FIG. 9 is a block diagram illustrating a configuration of an ABR-compatible shaping apparatus.
Figure 10:
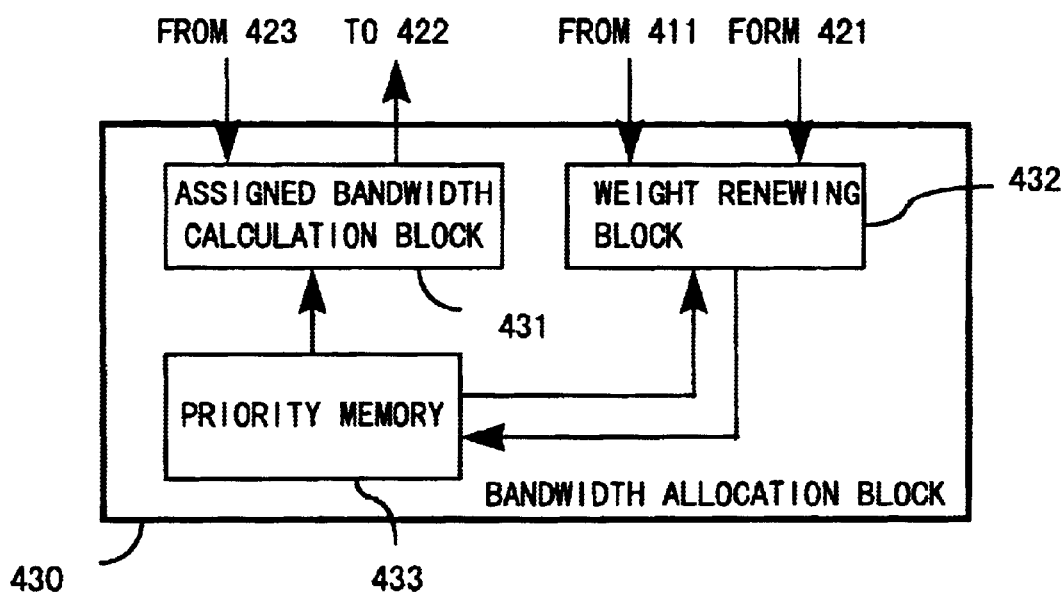
FIG. 10 is a block diagram depicting a configuration of a bandwidth allocation block.

A block diagram illustrative of the shaper 410 and the ABR bandwidth calculation block 420 is shown in FIG. 9, and a block diagram illustrative of the bandwidth allocation block 430 is shown in FIG. 10, respectively.

Figure 3:
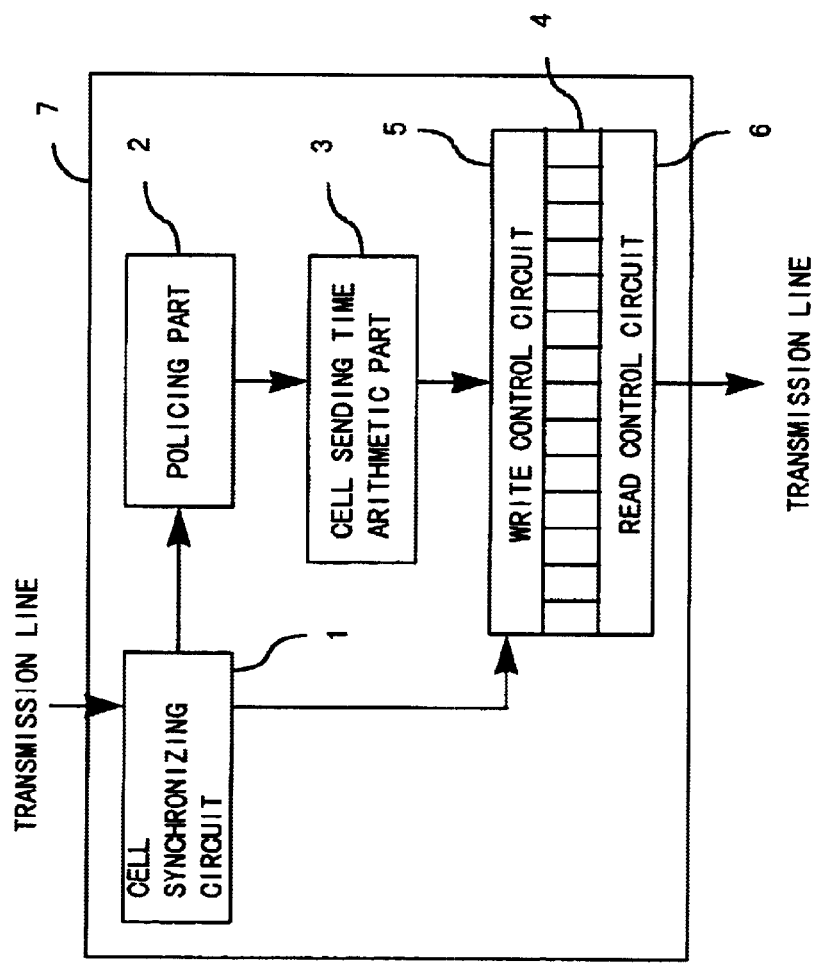
FIG. 3 is a block diagram depicting a configuration of a conventional shaping apparatus.
Figure 4:
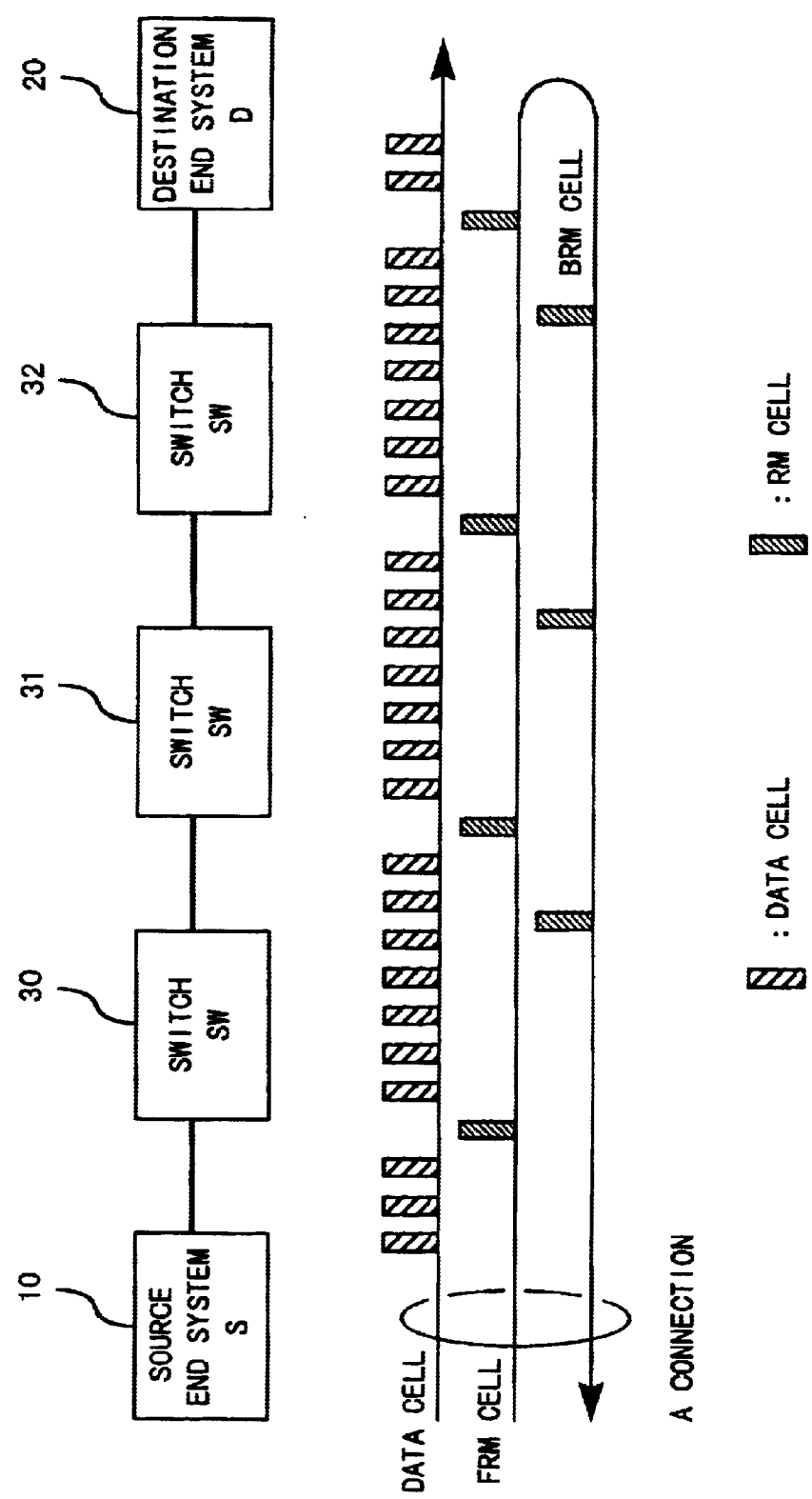
FIG. 4 is a diagram showing the flow of ABR class cells.
Figure 5:
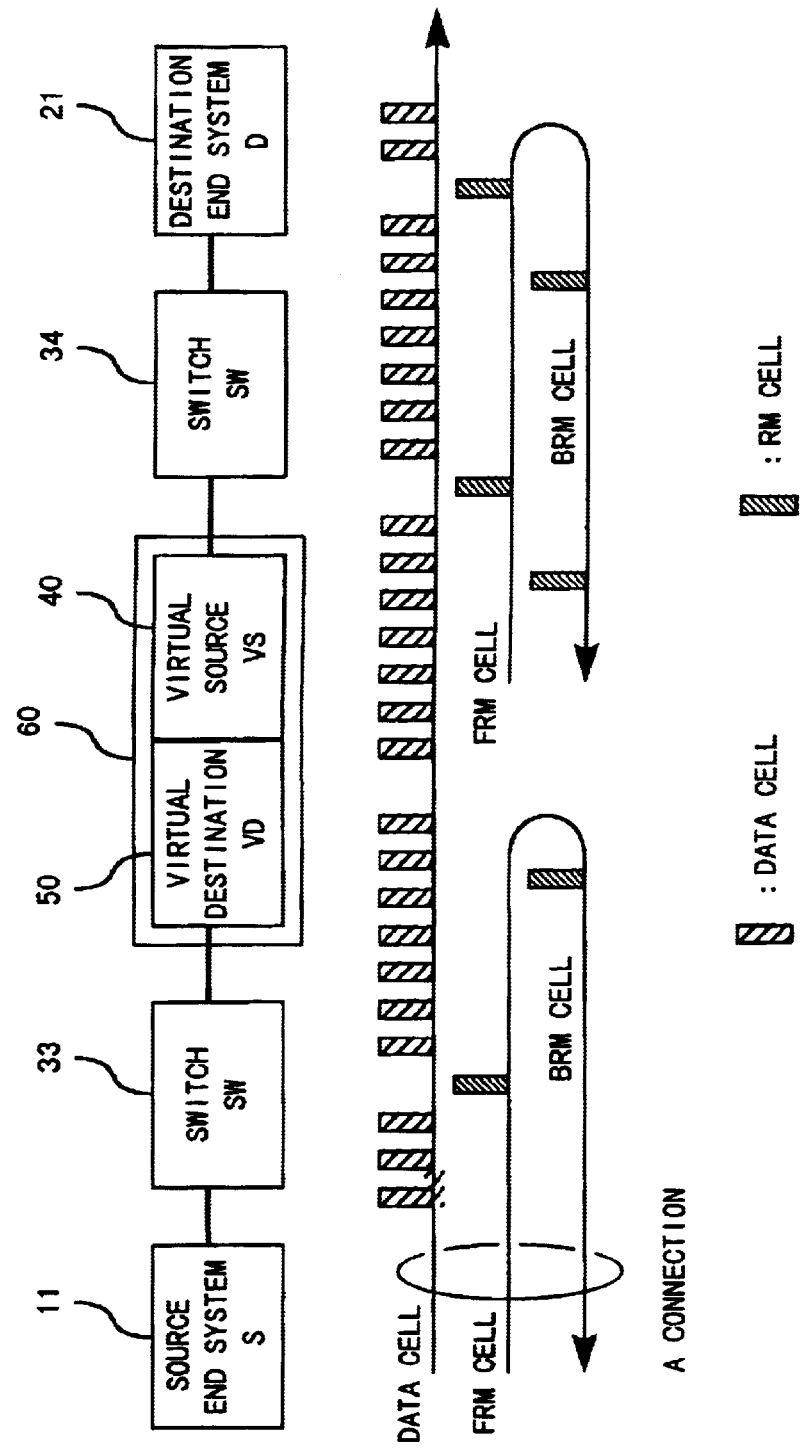
FIG. 5 is a diagram illustrating the flow of ABR class cells in a network provided with VS/VD as an independent node.

The shaper 410 has a structure similar to that for the cell flow control device 7 employed in the Prior Art 2 shown in FIG. 3. In other words, the cell sending time arithmetic part 3 shown 20 in FIG. 3 corresponds to a cell sending time calculation block 412 and a cell sending interval memory 413, the memory 4 corresponds to the cell buffer 400, and the write control circuit 5 and read control circuit 6 correspond to a cell buffer controller 411. Further, the VD 50 comprises a cell type recognition block 500 for making a decision as to the type of each received cell (data cell, FRM cell and BRM cell), and sending the data cell to a shaper 450 when the received cell is found to be the data cell, sending the FRM cell to the shaper 410 when the received cell is found to be the FRM cell, and extracting congestion notification information in the BRM cell when the received cell is found to be the BRM cell and notifying it to the ABR bandwidth calculation block 420.

Figure 8:
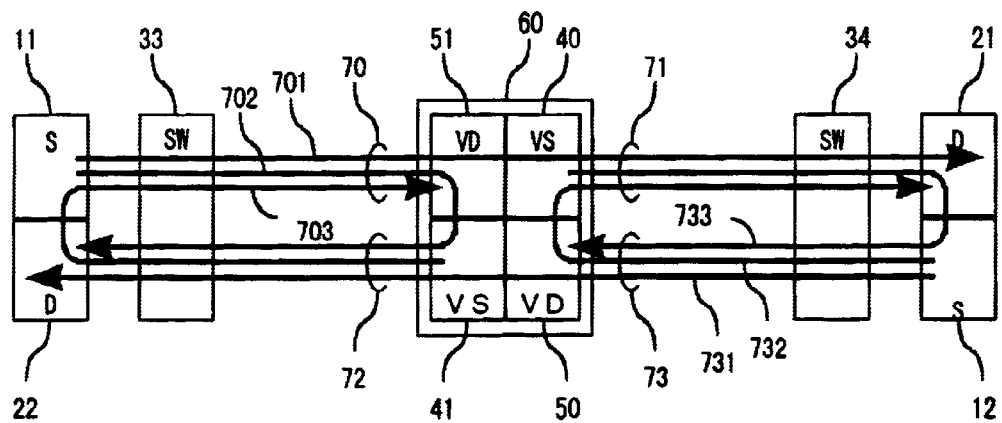
FIG. 8 is a diagram showing the flow of all the cells in the connection shown in FIG. 6.
Figure 19:
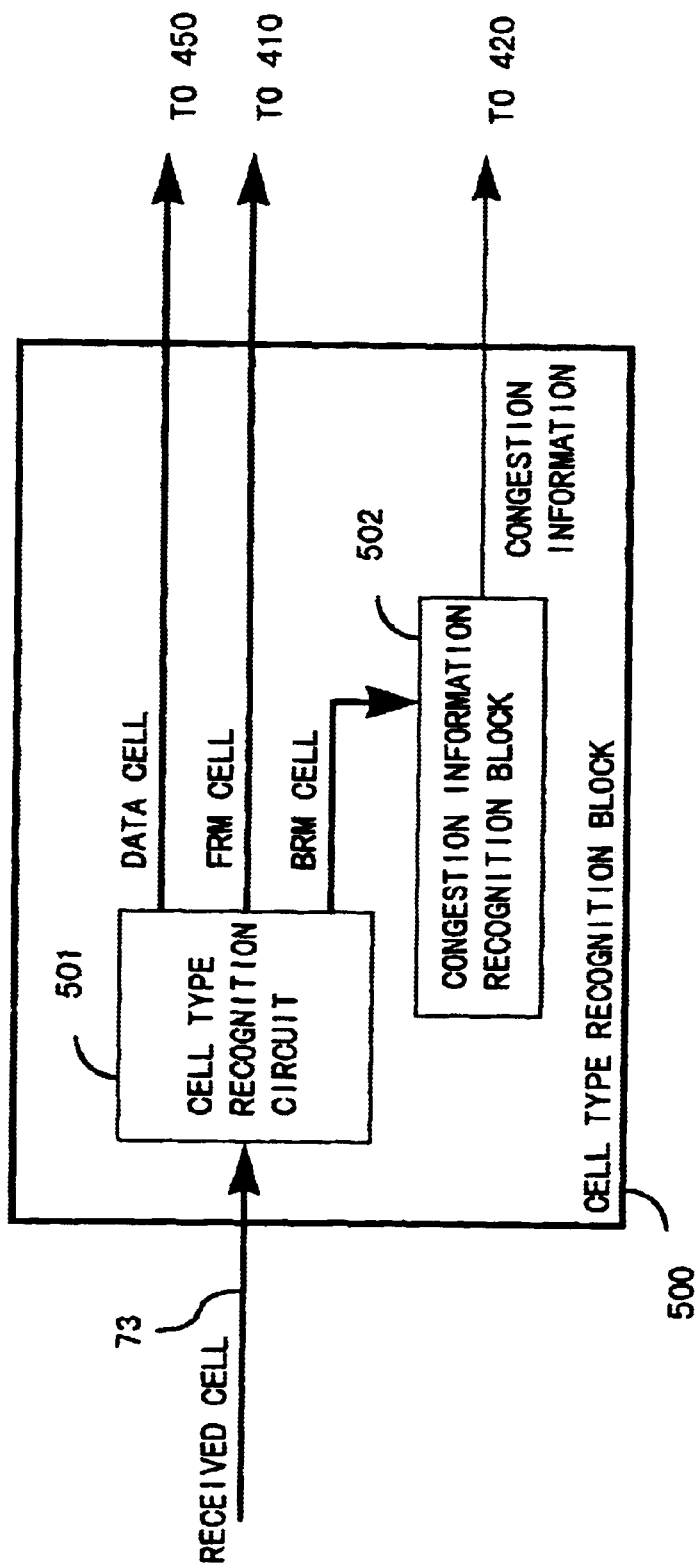
FIG. 19 is a block diagram of a cell type recognition block.

A block diagram illustrative of the cell type recognition block 500 is shown in FIG. 19. A VS 41 and a VD 51 have the same structures as those for the VS 40 and VD 50 respectively. FIG. 8 shows the flow of cells transmitted and received by a device or terminal 60 according to the present invention.

The VD 51 receives each cell from a communication path 70. The cells flowing through the communication path 70 include a data cell 701 produced by a source terminal 11 and transferred to a destination terminal 31, an FRM cell 702 produced by the source terminal 11 and sent back to a destination terminal 22, and a BRM cell 703 produced by the VS 41 and sent back from the destination terminal 22. Similarly, cells received by the VD 50 from a communication path 73 also include a data cell 731, an FRM cell 732 and a BRM cell 733. The type of cell received from the communication path 73 is determined or recognized by the cell type recognition block 500 (see FIG. 1) in the VD 50.

The block diagram illustrative of the cell type recognition block 500 is shown in FIG. 19. The cell type recognition block 500 comprises a cell type recognition circuit 501 for making a decision as to the type of cell, transferring, if the cell is found to be a data cell according to the result of decision, the data cell to the shaper 450 for the purpose of transmitting it to a transmission line or communication path 72, transferring, if the cell is found to be an FRM cell, the FRM cell to the shaper 410 for the purpose of sending it back to a communication path 71, and transferring, if the cell is found to be a BRM cell, the BRM cell to a congestion information recognition block 502, and the congestion information recognition block 502 for detecting a congestion notification bit in a received cell only when the received cell corresponds to the BRM cell and notifying it to the ABR bandwidth calculation block 420 to change a shaping bandwidth. The type of cell can be easily determined by a cell type identifier (payload type) lying in a header of each cell. Further, the FRM cell and BRM cell can be determined or recognized by the DIR bits in the RM cell as described above.

A description will be made below of the operation of the terminal 60 at the time that the VD 51 receives the data cell and the FRM cell from the communication path 70 and the VD 50 receives the BRM cell from the communication path 73. Even when the data cell and FRM cell are received from the communication path 73 or the BRM cell is received from the communication path 70, the terminal performs operation similar to the above.

A description will first be made of the operation thereof at the time that a cell of a traffic class other than the ABR class is received.

In the traffic class other than the ABR class, no RM cell is transferred and only the data cell is transferred. When cells of classes other than the ABR class are received, the cell type recognition circuit 501 of VD 51 determines the type of received each cell. The received cells are all assigned addresses by the shaper 410 provided within the VS 40 and stored in the cell buffer 400.

As shown in FIG. 11, cell intervals 4130 and next-cell estimated sending times 4131 are stored for each connection in the cell sending interval memory 413. The cell buffer controller 411 shapes each cell at the cell intervals 4130 stored in the cell sending interval memory 413 and transmits it to the communication path 71. After the transmission of each cell, the cell sending time calculation block 412 calculates a next-cell estimated sending time and stores it in the cell sending interval memory 413. A method of calculating the next-cell estimated sending time is based on a leaky bucket system or the like, for example. The leaky bucket system has been described in, for example, the Prior Art 1 of "Normative Annex C. 1 Equivalence of Virtual Scheduling and Continuous Leaky Bucket Algorithms".

A description will next be made of the operation of the terminal at the time that each cell of the ABR class is received. In the ABR class, the FRM cell and BRM cell are transferred in addition to the data cell as described above. When each cell of the ABR class is received from the communication path 70, the cell type recognition circuit 501 determines the type of each cell. When the VD 51 receives data cells from the communication path 70, they are assigned addresses by the shaper 410 of VS for the purpose of sending the same to the communication path 72 and stored in the cell buffer 400. When the VD 51 receives a FRM cell from the communication path 70, each FRM cell is assigned an address by the shaper 450 of VS for the purpose of sending it to the communication path 72 as a cell to be sent back, and stored in the cell buffer 440. At this time, the DIR bit is changed from "0" to "1" to transmit the FRM cell as the BRM cell.

With respect to the ABR class, each actually cell-transmitting/receiving connection is required to be recognized as an active connection upon allocation of each cell shaping bandwidth. Thus when a cell is received, the cell buffer controller 411 shown in FIG. 9 determines whether a connection placed in a non-active state is brought to an active state, and notifies the result of determination to the bandwidth allocation block 430. The operation of the bandwidth allocation block 430 will be described later.

The transmission of each cell is the same as to cell sending other than one for the ABR class. However, this is different from other than the ABR class only in that the FRM cell and the BRM cell to be sent back are transmitted in mixed form in accordance with the cell sending rule of the Prior Art 1. When a transmit connection is changed from an active state to a non-active state due to the cell sending, this is notified to the bandwidth allocation block 430 in a manner similar to the cell reception. When the VD 50 receives a BRM cell from the communication path 73, the congestion information recognition block 502 extracts only congestion notification information in the BRM cell and the cell itself is not stored. The extracted congestion notification information is notified to the ABR bandwidth calculation block 420 for sending it to the communication path 71.

In FIG. 9, the noticed bandwidth calculation block 421 calculates a noticed bandwidth in accordance with the calculation formula described in the cited reference 1 on the basis of the information stored in the shaping information memory 423.

As shown in FIG. 12, a shaping bandwidth (ACR in the reference 1) 4230, and a minimum cell rate MCR 4231, a maximum cell rate PCR 4232, a shaping bandwidth increase rate RIF 4233 and a shaping bandwidth decrease rate RDF 4234 or the like contracted when the connection was established are stored in the shaping information memory 423 for each connection. Here, the term "ACR" described in the reference 1 and the notification bandwidth employed in the present invention show the same meaning.

Figure 20:
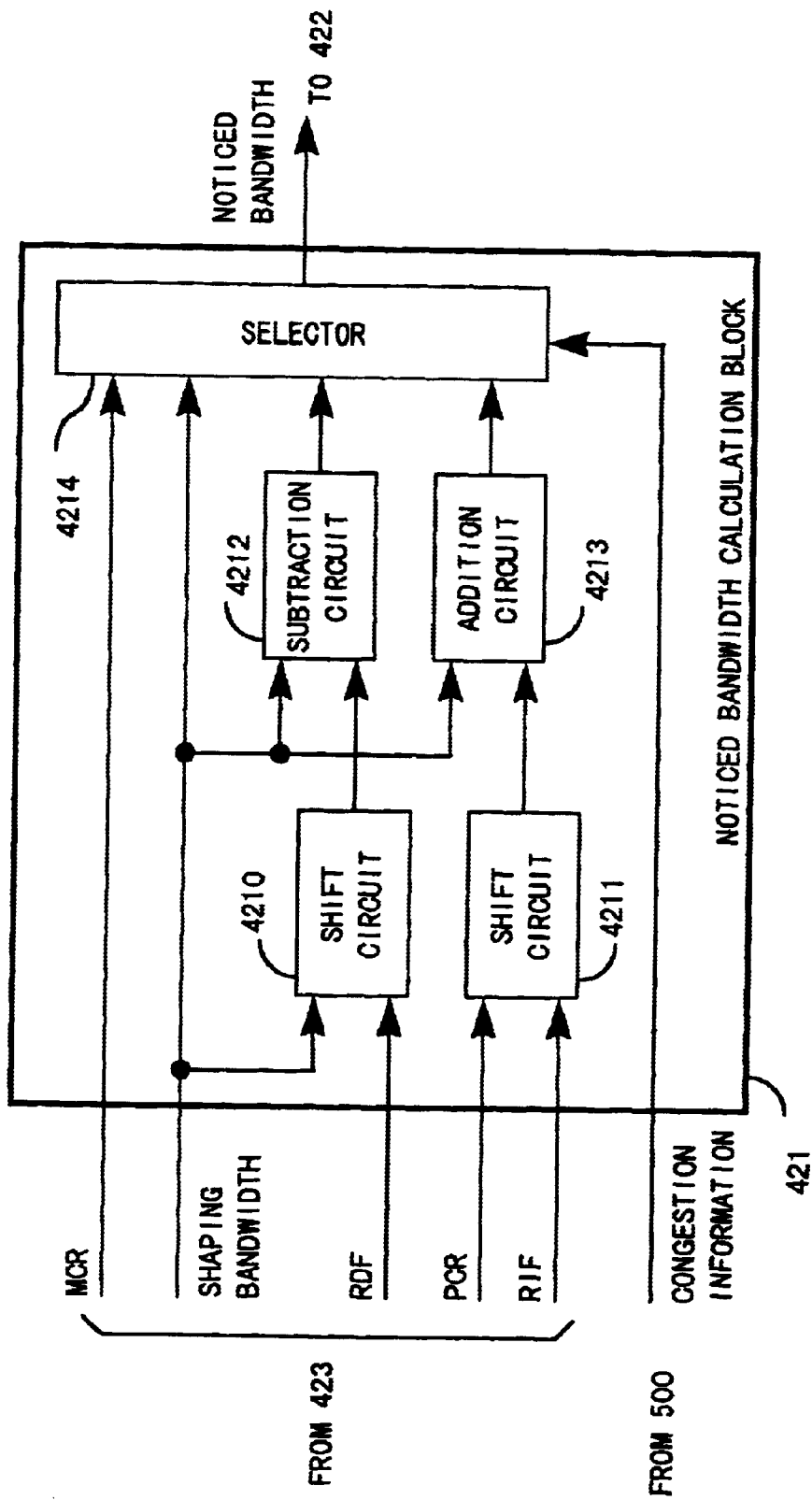
FIG. 20 is a detailed block diagram of a noticed bandwidth calculation block.

As shown in FIG. 20, the noticed bandwidth calculation block 421 can be easily comprised of shift circuits 4210 and 4211, an addition circuit 4213, a subtraction circuit 4212 and a selector 4214. The calculated noticed bandwidth is notified to the shaping bandwidth calculation block 422. The shaping bandwidth calculation block 422 sets one small in value, of two bandwidths: the noticed bandwidth and an allocated bandwidth (to be described later) calculated by the bandwidth allocation block 430, as a shaping bandwidth. Further, the shaping bandwidth calculation block 422 writes the shaping bandwidth back into the shaping information memory 423 and converts the shaping bandwidth into a shaping interval to thereby update or renew each sending interval information in the cell sending interval memory 413. Thus, such a VS/VD can be realized that operates to make wide the sending interval by reducing the shaping bandwidth when the congestion notification is received through the BRM cell, whereas operates to make narrow the sending interval by increasing the shaping bandwidth when no congestion notification is received.

A description will next be made of the operation of bandwidth allocation block 430 for allocating surplus bandwidths (to be described later) for ABR to active connections according to priority rates set to respective connections.

A block diagram illustrative of the bandwidth allocation block 430 is shown in FIG. 10. As shown in FIG. 13, the priority memory 433 provided within the bandwidth allocation block 430 stores therein priority information (fixed values) 4330 indicative of priorities for bandwidth allocation of the respective connections, and allocated bandwidth information (variable values) 4331 used in an actual bandwidth allocation calculation with the priority information as the maximum value, for each connection. Incidentally, initial set values are allocated according to the priority by setting the allocated bandwidth information equal to the priority information.

While a set of n natural numbers (1, 2, . . . , n, n) is used as candidates for priority information and a set (0, 1, 2, . . . , n) obtained by adding "0" to the set of n natural numbers is used as candidates for allocated bandwidth information in the interests of simplicity in the present embodiment, both the priority information and the allocated bandwidth information may be decimal fractions. It is also unnecessary to set the set used as the candidates for the priority information as a subset of the set used as the candidates for the allocated bandwidth information.

In addition to the above-described parameters, a surplus bandwidth 4332 for ABR and total active bandwidth information 4333 corresponding to the sum of allocated bandwidth information for active connections of the ABR class are stored in the priority memory 433 as common information for overall ABR class. The surplus bandwidth 4332 for ABR corresponds to a bandwidth obtained by subtracting a shaping bandwidth such as speech/picture or the like which is ensured and being transmitted, and MCR of the ABR class from a bandwidth of the communication path. The surplus bandwidth 4332 is a fixed value unless a connection is newly set or reset.

When the BRM cell is received from the communication path 73, congestion notification information is extracted. Further, the noticed bandwidth calculation block 421 calculates a noticed bandwidth and at the same time the bandwidth allocation block 430 calculates an allocated bandwidth. The calculation of the assigned bandwidth is carried out by the assigned bandwidth calculation block 431.

Figure 14:
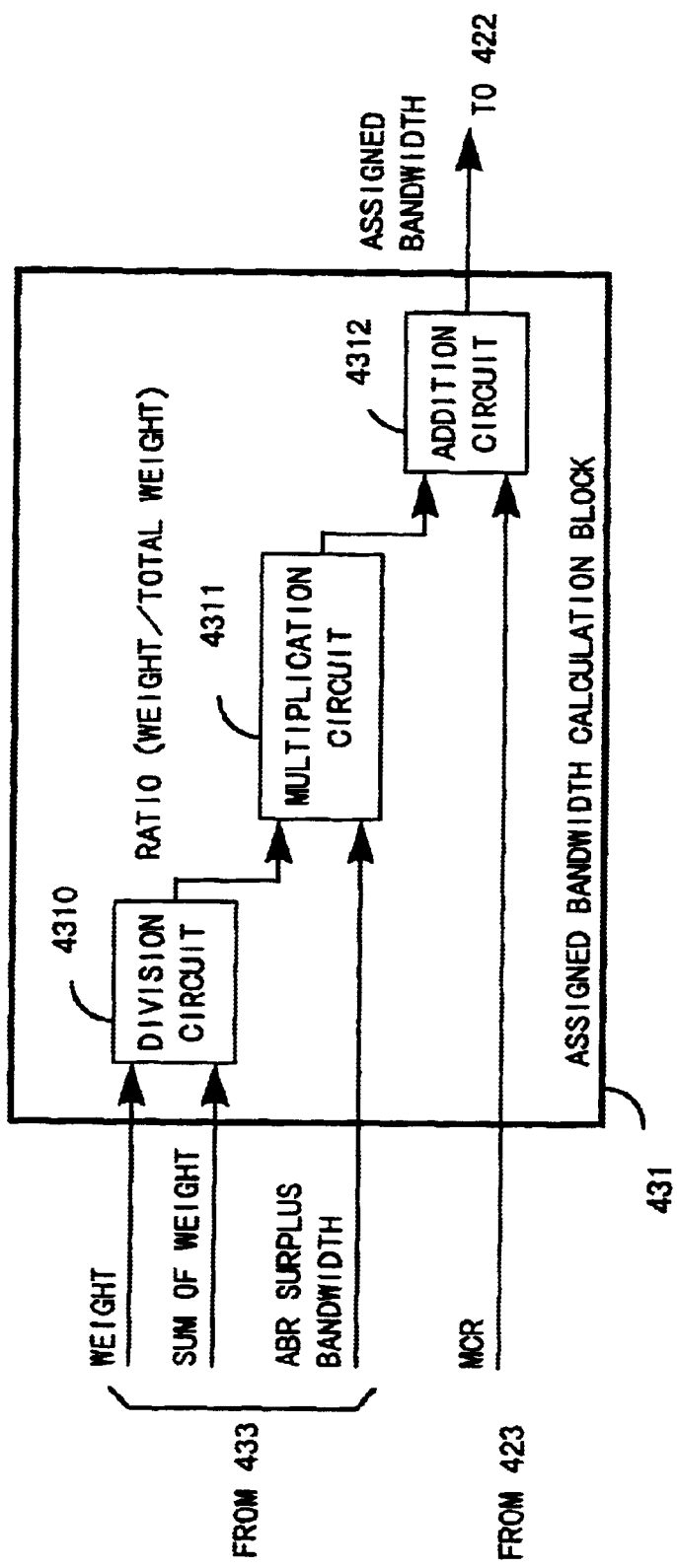
FIG. 14 is a detailed block diagram of an assigned bandwidth calculation block.

A detailed block of the assigned bandwidth calculation block 431 is shown in FIG. 14. Each assigned bandwidth is calculated by using allocated bandwidth information, total active bandwidth information and a surplus bandwidth for ABR all of which are read out from the priority memory 433 according to the corresponding connection numbers, and MCR read out from the shaping information memory 423. Incidentally, the bandwidth for ABR is one obtained by adding together a value corresponding to the sum of MCR for the respective connections and the surplus bandwidth for ABR.

First of all, a division circuit 4310 calculates a ratio (allocated bandwidth information/total active bandwidth information) of allocated bandwidth information for the corresponding connection to total active bandwidth information. Next, a multiplication circuit 4311 calculates a value: (surplus bandwidth for ABR)×(allocated bandwidth information/total active bandwidth information). Finally, an addition circuit 4312 adds MCR of the corresponding connection number to the result of calculation by the multiplication circuit 4311 and sets the resultant added value as the assigned bandwidth. Since MCR is finally added to the result of calculation, the assigned bandwidth becomes a value greater than or equal to MCR at all times.

Figure 22:
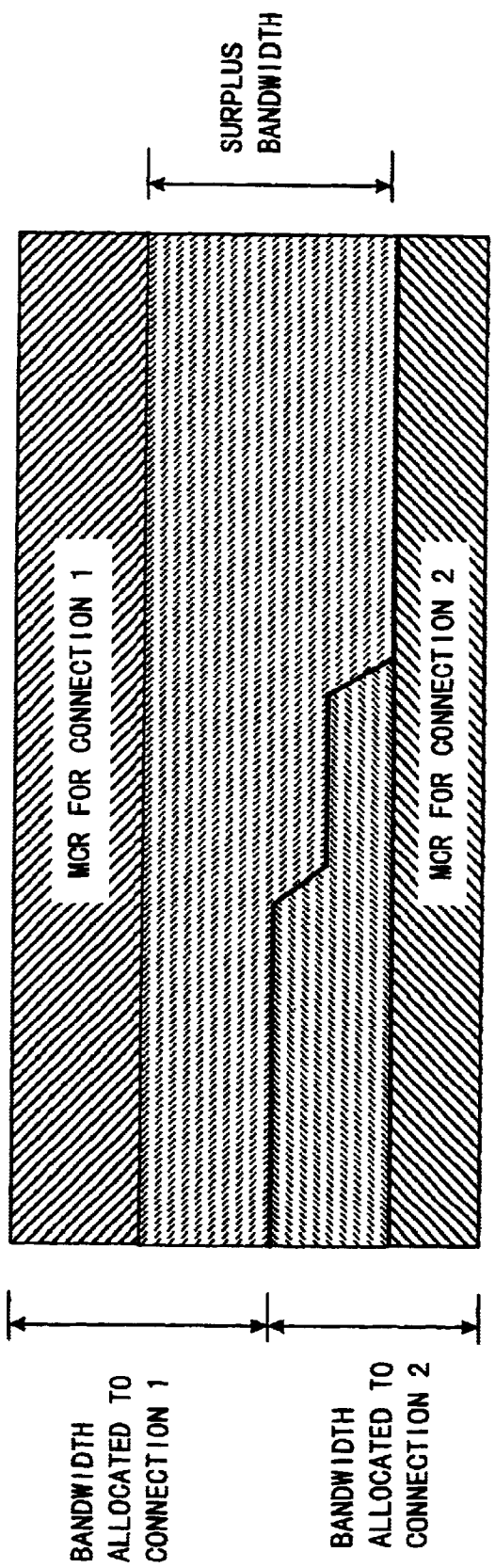
FIG. 22 is a diagram illustrating the variation in bandwidth allocated to connections.

FIG. 22 shows an example in which surplus bandwidths are allocated to two connections. Although the surplus bandwidths allocated to the two connections varies depending on the value of (surplus bandwidth for ABR)×(allocated bandwidth information/total active bandwidth information), MCR is certainly assured for each connection. The assigned bandwidth corresponding to the result of calculation is notified to the shaping bandwidth calculation block 422 where one small in value, of the noticed bandwidth and each allocated bandwidth is used as a shaping bandwidth as described above. The shaping bandwidth calculation block 422 converts the shaping bandwidth into a shaping interval to thereby update or renew each sending interval information in the cell sending interval memory 413. Next, operation for releasing an excessive bandwidth for other connections when a bandwidth is excessively assigned to a connection by the assigned bandwidth calculation block 431, will be explained. The above operation is implemented by the weight renewing block 432.

Figure 15:
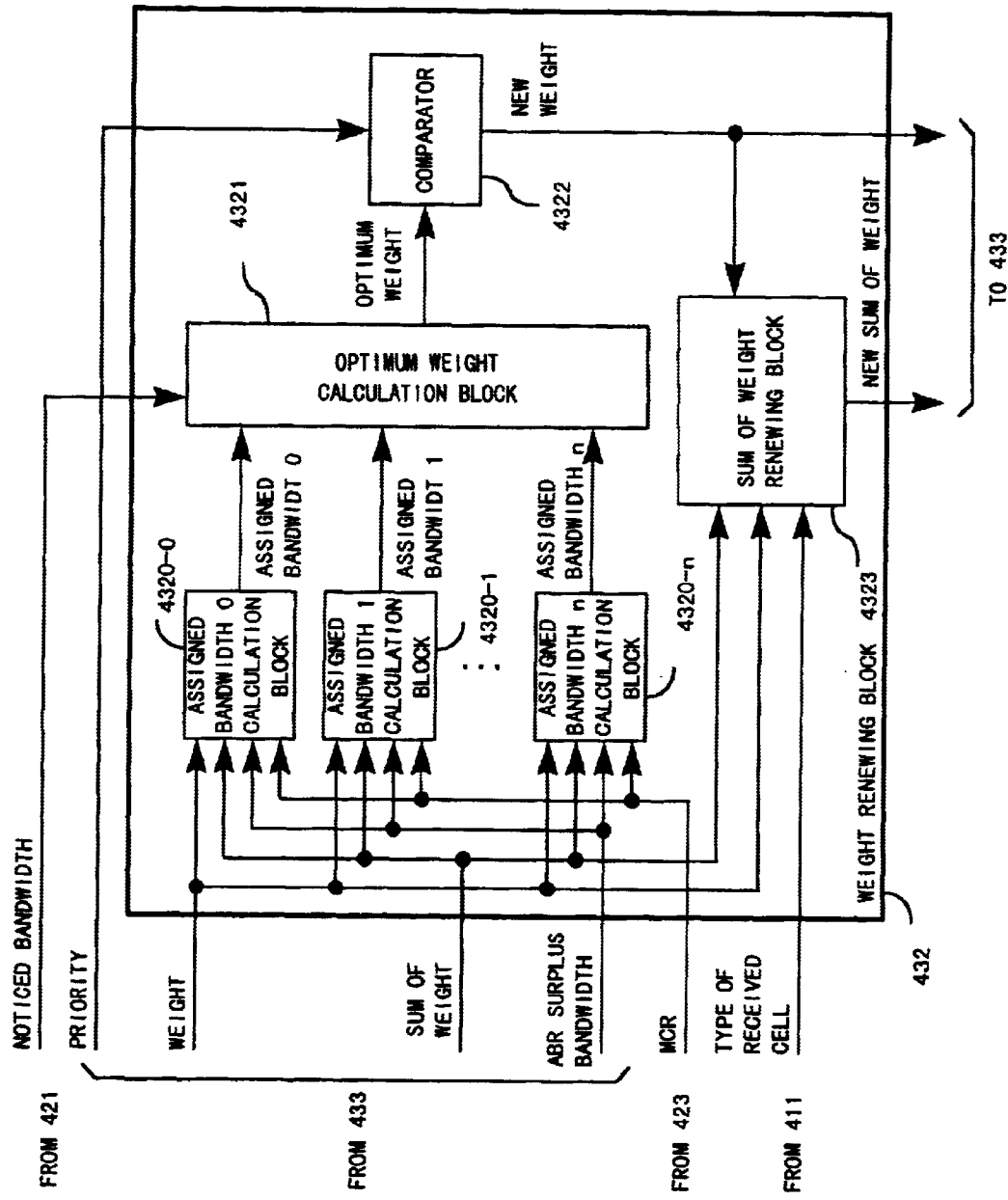
FIG. 15 is a detailed block diagram of a weight renewing block.
Figure 18:
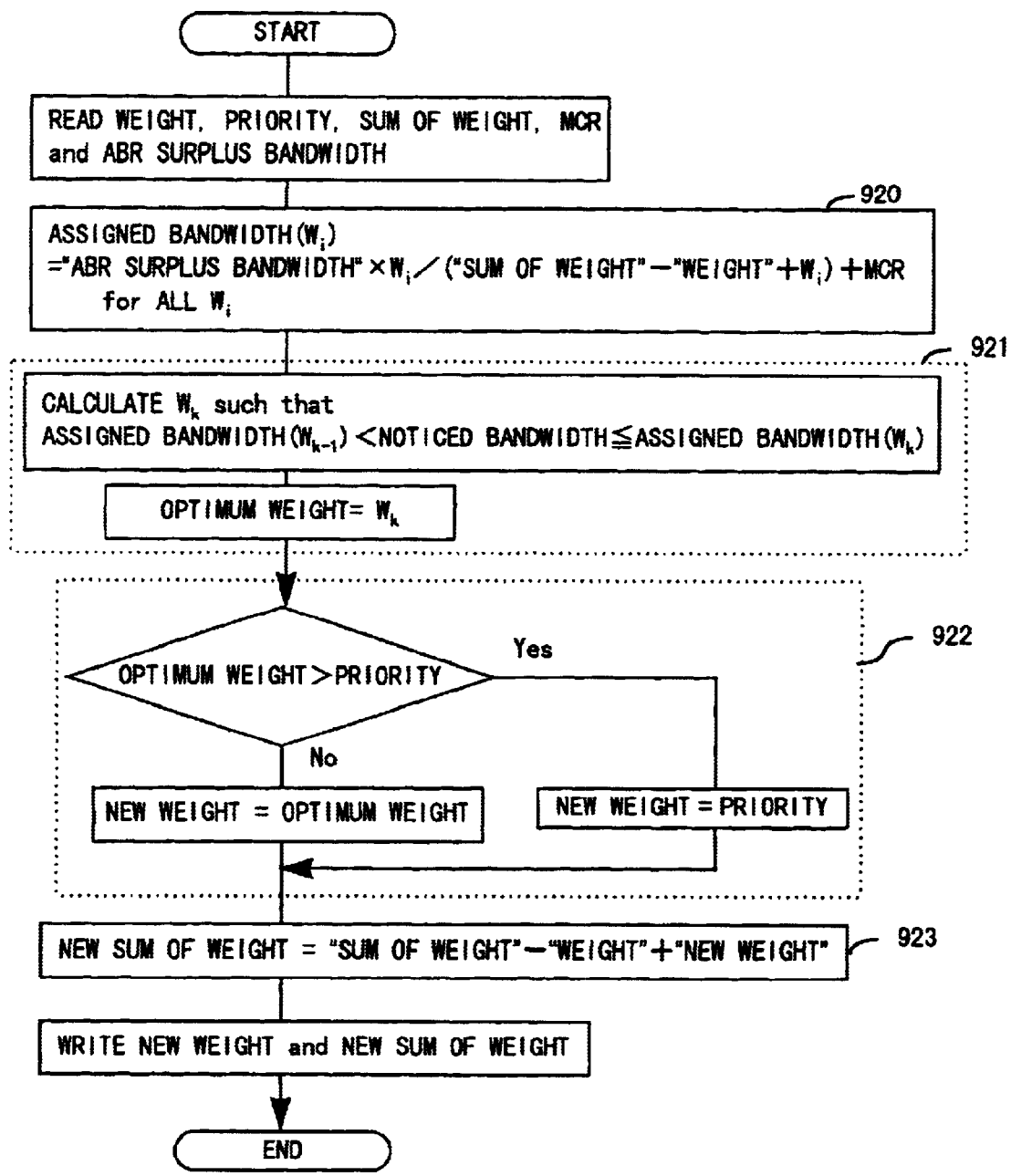
FIG. 18 is a flowchart showing the operation of the weight renewing block.

A detailed block diagram of the weight renewing block 432 is shown in FIG. 15 and its flow chart is shown in FIG. 18.

In the present embodiment, n+1 candidates exist as allocated bandwidth information. In the present embodiment, an assigned bandwidth 0 calculation block 4320-0 calculates an assigned bandwidth 0 at the time that a candidate Wi for the allocated bandwidth information next reaches 0. An assigned bandwidth 1 calculation block 4320-1 calculates an assigned bandwidth 1 at the time that the candidate Wi for the allocated bandwidth information next becomes 1. Further, an assigned bandwidth 2 calculation circuit 4320-2 calculates an assigned bandwidth 2 at the time that the candidate Wi for the allocated bandwidth information next reaches 2. Assigned bandwidths 3, 4, . . . are hereafter calculated in the same manner as described above.

The respective calculation blocks for calculating the assigned bandwidths 1, 2, 3 . . . are similar in configuration to the assigned bandwidth calculation block 431. However, they are different from the assigned bandwidth calculation block 431 in that the candidate Wi for the allocated bandwidth information is used as an alternative to the allocated bandwidth information shown in FIG. 14, a fixed value i ("0" when the assigned bandwidth 0 is calculated, "1" when the assigned bandwidth 1 is calculated, and "i" when the assigned bandwidth i is calculated) is used as the candidate Wi for the allocated bandwidth information, and a value: (the total active bandwidth information)−(allocated bandwidth information)+(fixed value i) is used in place of the total active bandwidth information. This calculating process corresponds to Step 920 in FIG. 18.

An optimum weight calculation block 4321 determines or obtains the value of allocated bandwidth information to define optimum allocated bandwidth information k which meets the following expression according to the relationship in size between the respective bandwidths corresponding to the results of calculation by the respective assigned bandwidth calculation blocks, i.e., the assigned bandwidths 0 through n and the noticed bandwidth calculated by the noticed bandwidth calculation block 421. Assigned bandwidth (k−1)<Noticed bandwidth≦Assigned bandwidth k. In this case, k=i. This processing corresponds to Step 921 in FIG. 18.

Figure 16:
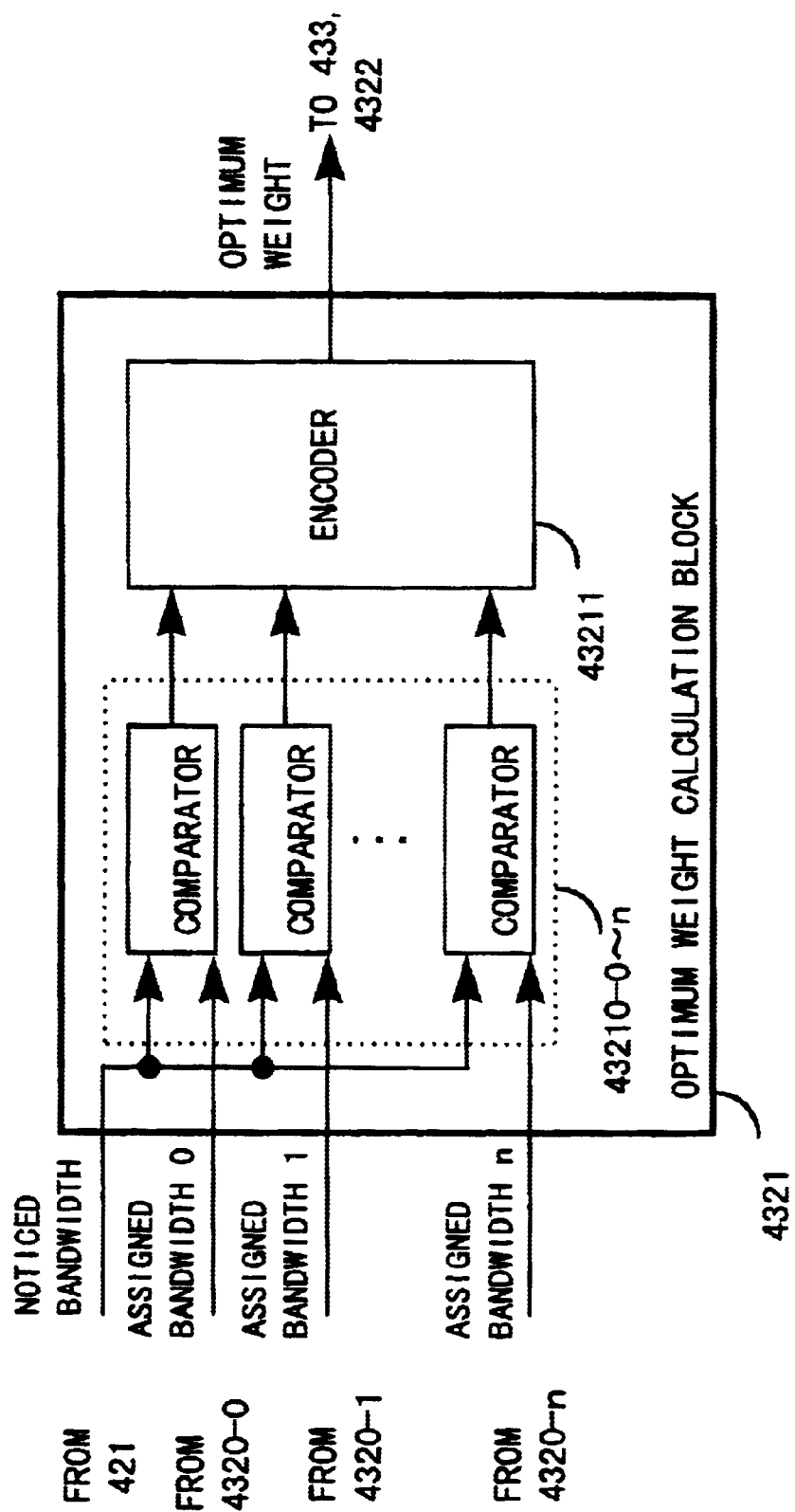
FIG. 16 is a detailed block diagram of an optimum weight calculation block.

A detailed block illustrative of the optimum weight calculation block 4321 is shown in FIG. 16. The optimum weight calculation block 4321 compare each assigned bandwidth i (0≦i≦n) calculated by the assigned bandwidth i calculation circuit (0≦i ≦n) and the noticed bandwidth by comparators 43210-0 through n. These comparison results are encoded by an encoder 43211.

A priority information excess recognition block or comparator 4322 in FIG. 15 determines new allocated bandwidth information so as not to become new allocated bandwidth information>priority information. Namely, when the optimum allocated bandwidth information≦priority information, the comparator 4322 sets the new allocated information=the optimum allocated bandwidth information. On the other hand, when the optimum allocated bandwidth information>priority information, the comparator 4322 sets the new allocated bandwidth information=the priority information. This processing corresponds to Step 922 in FIG. 18.

The total active bandwidth information corresponding to the sum of allocated bandwidth information for the active connections is also renewed depending upon a change in the value of the allocated bandwidth information. The total active bandwidth information is also renewed even when a given connection changes from a non-active state to an active state due to cell reception and changes from the active state to the non-active state due to cell transmission as described above as well as when the allocated bandwidth information varies according to the congestion notification from the BRM cell. The operation of a sum of weight renewing block 4323 for renewing the total active bandwidth information in the above-described three cases will be explained.

Figure 17:
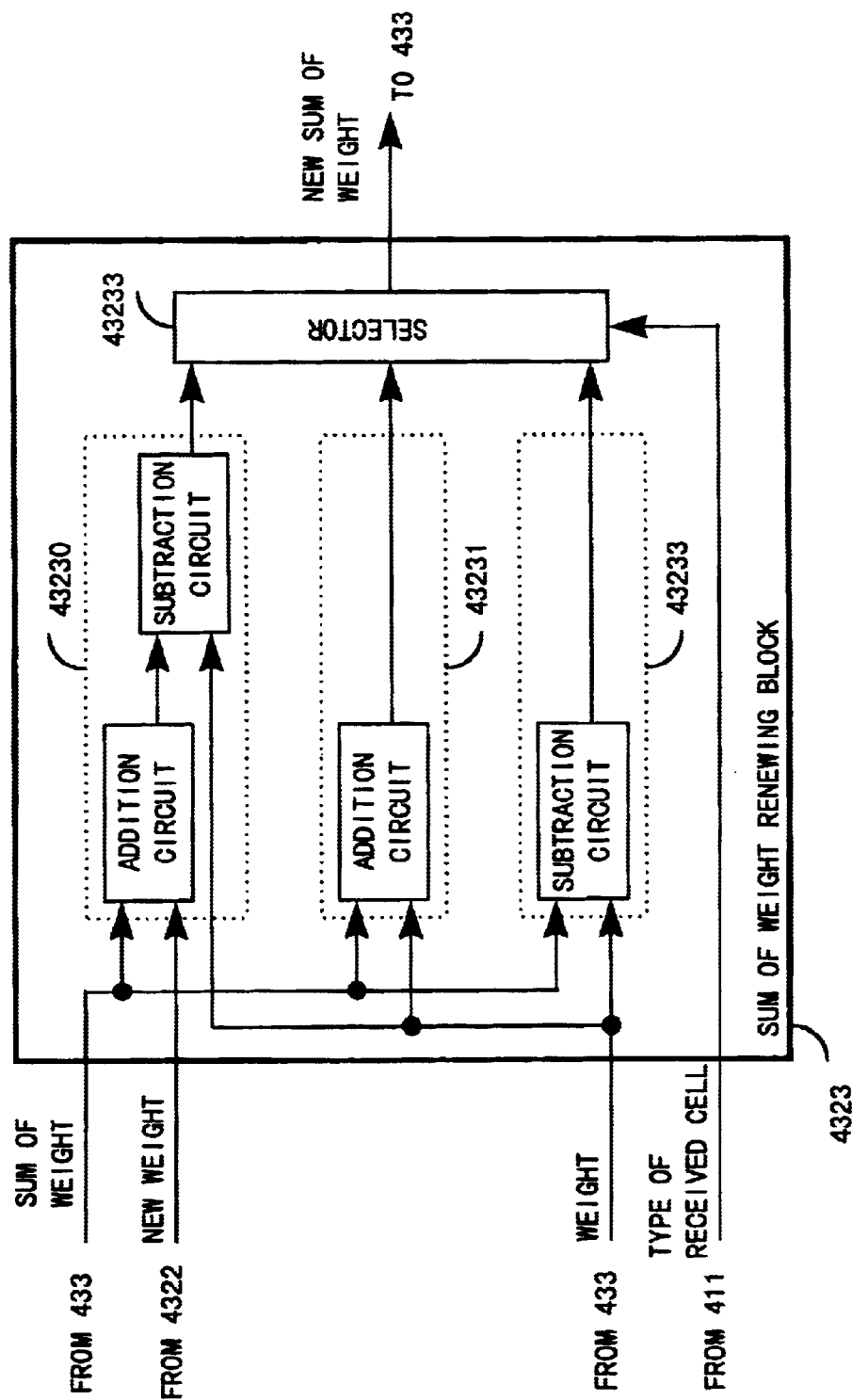
FIG. 17 is a detailed block diagram of a sum of weight renewing block.

A detailed block diagram of the sum of weight renewing block 4323 is shown in FIG. 17. When the allocated bandwidth information changes according to the congestion notification from the BRM cell, an addition circuit and subtraction circuit 43230 calculate a value of the new total active bandwidth information by the following expression: the new total active bandwidth information=(total active bandwidth information)−(allocated bandwidth information)+(new allocated bandwidth information). This processing corresponds to Step 923 in FIG. 18.

When the given connection changes from the non-active state to the active state due to the cell reception, an addition circuit 43231 calculates a value of the new total active bandwidth information by the following expression: the new total active bandwidth information=(total active bandwidth information)+(allocated bandwidth information).

When the given connection changes from the active state to the non-active state due to the cell transmission, a subtraction circuit 43232 calculates a value of the new total active bandwidth information by the following expression: the new total active bandwidth information=(total active bandwidth information)−(allocated bandwidth information).

Which value of the above three results of calculation should be selected as the final new total active bandwidth information, can be determined depending on the type of received cell where calculated timing is either transmit timing or receive timing or is the receive timing. This selection is carried out by a selector 43233. The new allocated bandwidth information and new total active bandwidth information obtained from the above-described results of calculation are respectively written back into the allocated bandwidth information region 4331 and the total active bandwidth information region 4333 of the priority memory 433.

According to the present invention, the allocated bandwidth information is changed according to the congestion-notified value when the BRM cell is received as described above. When the new allocated bandwidth information becomes smaller than the old allocated bandwidth information due to the change in allocated bandwidth information, the new total active bandwidth information also becomes smaller than the old total active bandwidth information. Considering this change from a viewpoint of another connection, as the total active bandwidth information becomes small even without changing it own allocated bandwidth information, the ratio (allocated bandwidth information/total active bandwidth information) increases. Namely, when the surplus bandwidths for ABR are assigned to the respective connections, it is able to allocate a greater value of bandwidth for each connection.

According to the present invention, as described above, if the use of a bandwidth allocated to specified one of connections by a bandwidth allocation function is limited to a reduced bandwidth due to the reason such as the congestion notification or the like, the other connections can transmit cells by using the surplus bandwidth released from the specified connection, whereby the availability of each communication path can be improved.

Figure 2:
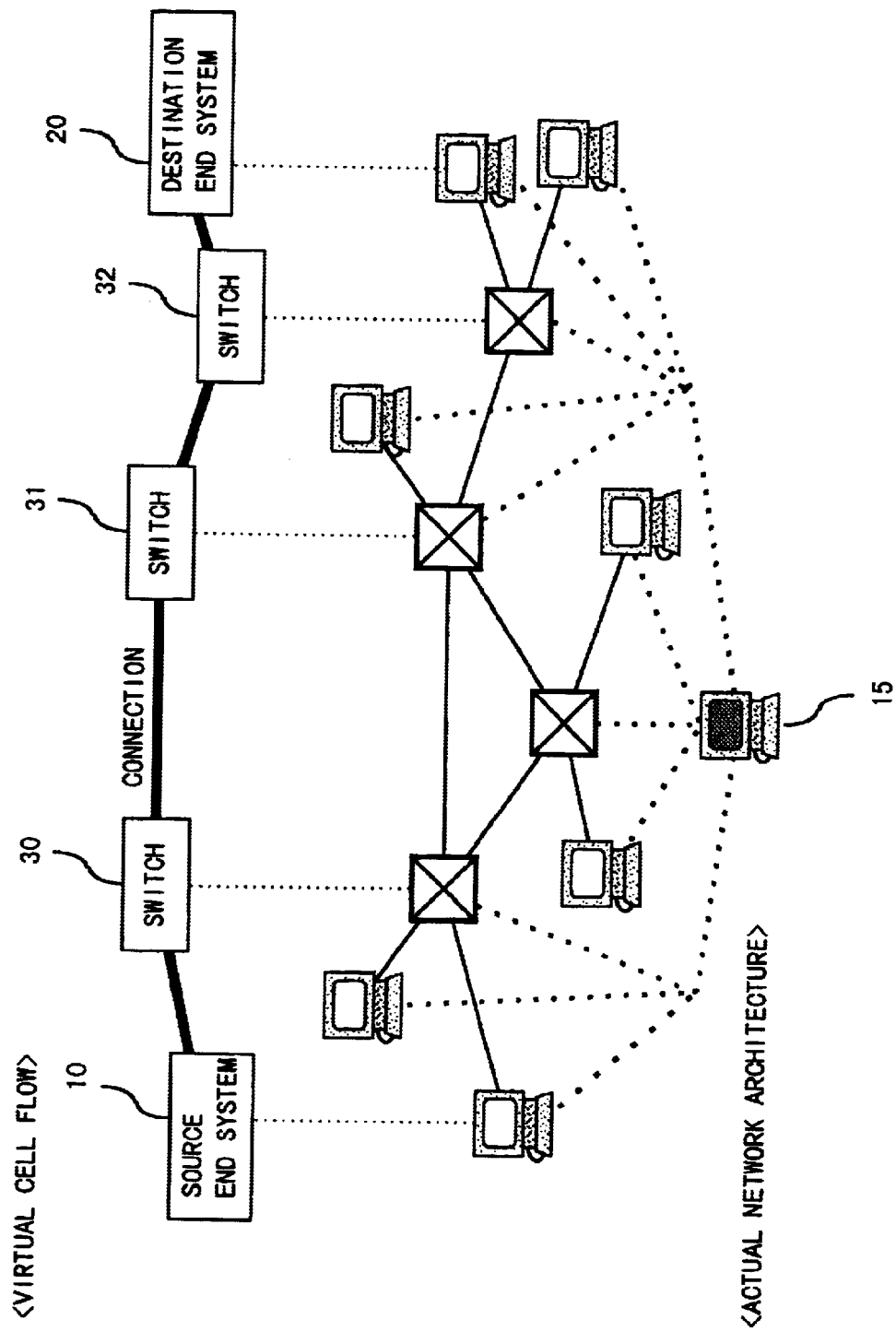
FIG. 2 is a block diagram illustrating the concept of connection in an asynchronous transfer mode network.

A method of setting the priority information for each connection is determined according to a method of establishing each connection. For the establishment of the connection, there are two types: a PVC (Permanent Virtual Call) for allowing the network management device 15 in FIG. 2 to set each connection in advance and a SVC (Switched Virtual Call) for notifying a parameter from a terminal to a network to thereby set the corresponding connection.

In the present invention, the priority for allocating shaping bandwidths for each connection can be set from the network management device 15 in the case of PVC. In the case of SVC, various parameters (e.g., parameters such as MCR, PCR, etc. in FIG. 12) are placed under a contract between a terminal and a network to establish each connection and the priority can be set as one of their contracted parameters.

Although the priority information for the bandwidth allocation is set for each connection and the shaping bandwidths are allocated thereto according to the priority as one embodiment of the present invention as described above, they may be allocated in the ratio proportional to MCR without setting particular parameter such as priority information. Described specifically, MCR is used in all the circuits as an alternative to the priority information and a value greater than 0 and less than MCR may be selected as the candidate for the allocated bandwidth information. If a connection with MCR=0 exists among the connections, however, since the shaping bandwidths for this connection is always 0, MCR cannot be used as the alternative to the priority information.

It is desired to uniformly allocate the bandwidths to a plurality of connections, the priority information need not be set. In this case, for example, the fixed value "1" (i.e., all the connections are equal to each other in priority) is used in all the circuits as an alternative to the priority information and a decimal fraction equal to or greater than 0 and equal to or less than 1 may be selected as the candidate for the allocated bandwidth information.

In the above description, all the shaping bandwidths are assured so as to become equal to or greater than the bandwidth (MCR) desired to be ensured as the minimum. Thus, the shaping bandwidths do not reach less than MCR.

Figure 6:
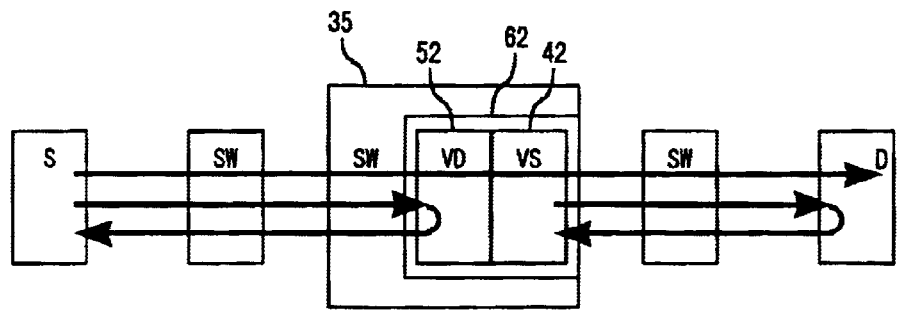
FIG. 6 is a connection diagram showing an ABR connection in a network including a switch provided with VS/VD at a line interface thereof.
Figure 7:
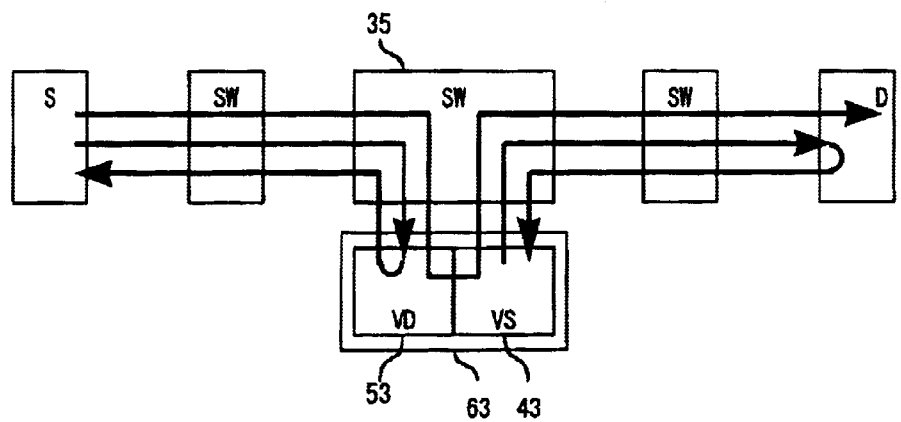
FIG. 7 is a connection diagram depicting an ABR connection in a network including a switch provided with VS/VD as a trunk attached thereto.

When it is unnecessary to assure MCR, the addition circuit 4312 shown in FIG. 14 can be omitted. When it is omitted, the output of the multiplication circuit 4311 results in assigned bandwidth. In this case, however, the surplus bandwidth for ABR is calculated as a bandwidth obtained by subtracting only a shaping bandwidth such as speech/picture or the like whose bandwidth is ensured and is being transmitted, from a bandwidth of the communication path. MCR is never subtracted from the bandwidth for each communication path. Incidentally, the above examples respectively show the case in which they are all constructed by VS/VD 60 used as independent nodes lying within the network. However, the VS/VD 62 may be provided in the line interface unit of the switch 35 as shown in FIG. 6. Alternatively, the VS/VD 63 may be configured as the trunk attached to the switch 36 as shown in FIG. 7. Either case can be implemented by the same structure as that shown in FIG. 1.

Further, the present invention may be implemented in a source terminal instead of implementing as VS/VD. In this case, since the source terminal includes only the VS 40 and VD 50 among the configuration in FIG. 1, it is also necessary to provide the source terminal with a device for converting or segmenting a high protocol layer of transmission packet into ATM cells as an alternative to the VD 51, and a device for converting or assembling ATM cells into a high protocol layer of packet as an alternative to the VS 41, respectively.

While the bandwidth allocation calculation is carried out upon reception of the RM cell in the above-described example, the calculation may be performed upon reception of any kind of cells including a user cell, or it may be carried out upon transmission of any kind of cells. Allowing all the cells as objects for bandwidth allocation increases triggers for bandwidth allocation, so that it can be stabilized to a steady state faster. Further, each allocated bandwidth may be calculated at regular intervals with timing independent of those for transmission and reception of each cell. In this method, an address is generated based on a clock (timer 414 in FIG. 9) used for shaping, for example, and the assigned bandwidth is regularly calculated. For example, the assigned bandwidth for each connection is calculated by the bandwidth allocation block 430 in FIG. 9, periodically according to a time signal produced by the timer 414. Further, by storing noticed bandwidth calculated based on congestion notification information notified by each BRM cell in the shaping information memory 423, the value of the noticed bandwidth can be reflected upon calculation of each shaping bandwidth by the shaping bandwidth calculation block 422. A specific shaping-bandwidth calculating method is similar to the case in which RM cell reception is set as a trigger.

While the embodiments all applied to the ABR class have been illustrated above, the present invention can be also applied to a UBR-class traffic free of RM cell-based feedback control. Since no RM cell is transferred, UBR can take a method of regularly performing bandwidth calculations using all-cell reception or all-cell transmission, or a timer as a trigger for bandwidth calculations.

EMBODIMENT 2

Figure 21:
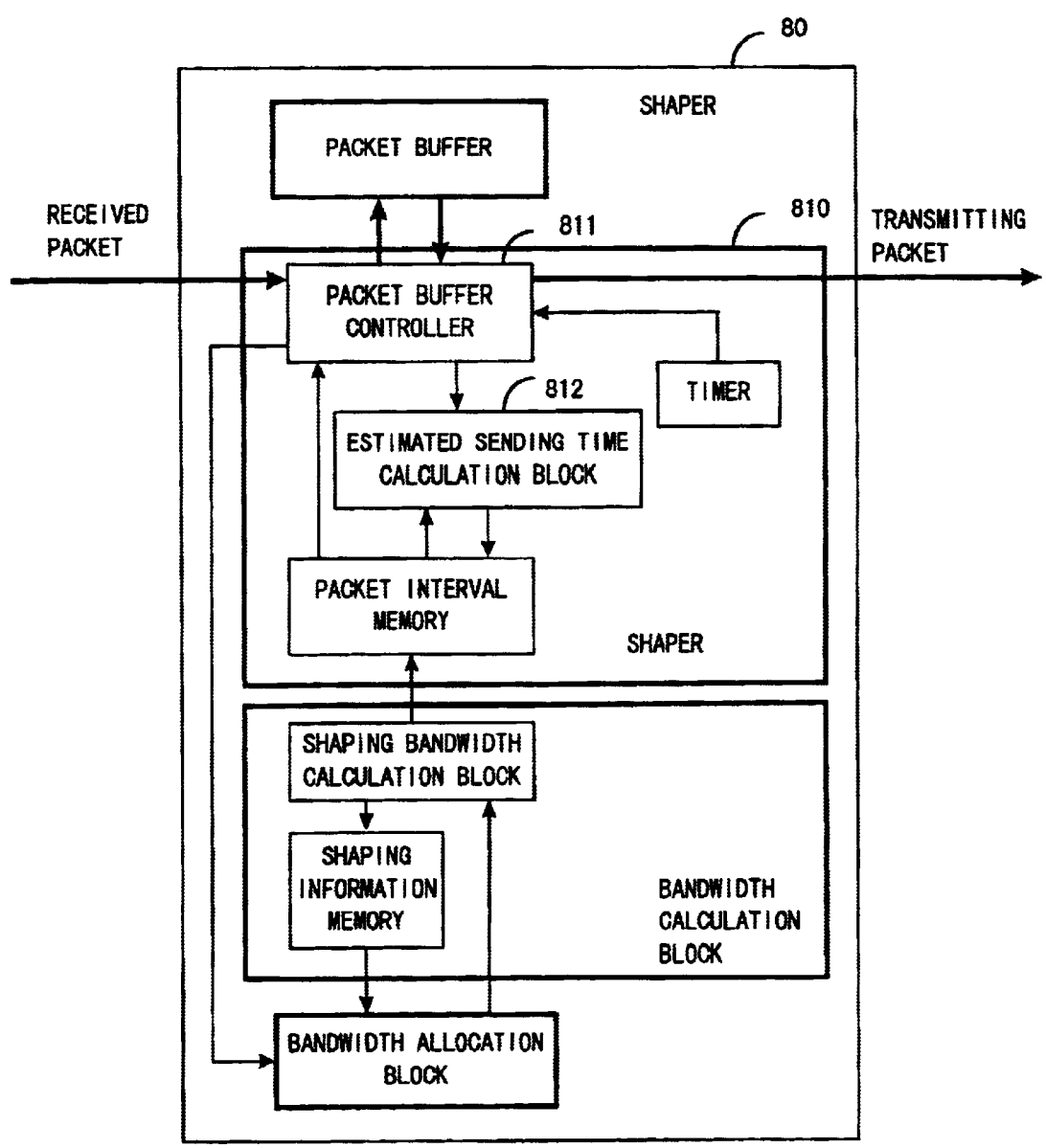
FIG. 21 is a block diagram showing a configuration of one embodiment in which the present invention is applied to an IP packet shaping apparatus.

An example in which the present invention is applied to a shaping device or shaper for transferring an IP packet, will next be described as a second embodiment with reference to FIG. 21. While the assignment of the bandwidths to the connections has been discussed in the first embodiment, the second embodiment will discuss the assignment of bandwidths to a flow. The shaper 80 shown in FIG. 21 is basically identical in configuration to the VS portion of VS/VD but different in the following points.

Since the IP packet is variable in length as distinct from the ATM cell, it is necessary to reflect packet length information on a sending interval. Namely, when it is desired to send a long packet, such an estimated sending time as to lengthen the sending interval between the long packet and the next packet is calculated. When it is desired to transmit a short packet, such an estimated sending time as to shorten the sending interval between the short packet and the next packet is calculated. Such shaping as to protect or maintain each set bandwidth on the average is performed. Described specifically, upon transmission of a packet, a packet buffer controller 811 provided within the shaper or shaping unit 810 notifies packet length information described within a header of the transmitted packet to an estimated sending time calculation block 812.

The estimated sending time calculation block 812 having received the packet length information performs the following calculation of estimated sending time, for example, to thereby determine or calculate an estimated sending time corresponding to a packet length: estimated sending time= (present time)+(number of sending bytes)×(reference bandwidth/shaping bandwidth).

Here, the reference bandwidth indicates such a bandwidth that '1' of a clock or timer is set to a packet interval of 1 byte. The number of the sending bytes corresponds to packet length information notified from the packet buffer controller 811. According to the above calculation, a variable-length packet can be transmitted at sending intervals each corresponding to a sending packet length.

Although the cell sending device or cell shaper is constructed which is capable of performing allocation calculations of shaping bandwidths and re-allocation calculations of excessively-assigned bandwidths by hardware at high speed in the present invention, similar calculations can be also performed by software. According to the present invention as described above, when a source terminal allocates shaping bandwidths to each individual ABR connections, the bandwidths can be assigned thereto in preference to important connections. Thus, each cell can be transferred preferentially.

When a connection having received congestion notification therein is not able to send information in shaping bandwidths assigned according to bandwidth allocation, other connections can take advantage of a bandwidth corresponding to the difference therebetween according to a priority rate without any change in priority information.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A source terminal for transferring data cells and congestion notification cells to a destination terminal through a connection preset within an asynchronous transfer mode network including at least one transit switching system, comprising:

shaping bandwidth control means for increasing or decreasing each of shaping bandwidths, based on congestion notification information written in to a congestion notification cell sent back from said destination terminal or said transit switching system to said source terminal in a congested status, said shaping bandwidth control means including, memory means for storing therein priority information indicative of priorities for bandwidth allocation at cell transfers for each connection; and means for allocating shaping bandwidths between all connections each placed in a cell transfer state, based on the priority information when a plurality of said connections are simultaneously placed in the cell transfer state.

2. The source terminal according to claim 1, wherein said shaping bandwidth control means includes means for multiplying a ratio obtained by dividing the priority information for said respective connections by the sum of the priority information for all the connections each placed in the cell transfer state, of connections established over the same line as that for said connections by each shaping bandwidth for said line, thereby calculating a cell shaping bandwidth proportional to the priority information for each connection.

3. The source terminal according to claim 1, wherein
said shaping bandwidth control means has memory means for storing therein information of minimum secured bandwidth values for each connection, and
said shaping bandwidth calculating means includes means for multiplying a ratio obtained by dividing the priority information for said respective connections by the sum of the priority information for all connections each placed in a cell transfer state, of connections established over the same line as that for said connections by a bandwidth obtained by subtracting the sum of minimum secured bandwidths for all connections to be sent to said line from the shaping bandwidth for said line, and for adding said information of minimum secured bandwidth value to the obtained result thereby to calculate cell shaping bandwidths for each connection,
whereby said shaping bandwidth control means ensures the minimum secured bandwidth for each connection and allocates the cell shaping bandwidths to said respective connections in proportion to the priority information for said respective connections as bandwidths freely allocable with said respective connections.

4. A source terminal for transferring data cells and congestion notification cells to a destination terminal through a connection preset within an asynchronous transfer mode network including at least one transit switching system, comprising:
shaping bandwidth control means for increasing or decreasing each of shaping bandwidths, based on congestion notification information written into a congestion notification cell sent back from said destination terminal or said transit switching system to said source terminal in a congested status,
said shaping bandwidth control means including,
memory means for storing therein priority information indicative of priorities for bandwidth allocation at cell transfers for each connection; and
means for multiplying a ratio obtained by dividing a minimum secured bandwidth for each connection by the sum of minimum secured bandwidths for all connections each established over the same line and placed in a cell transfer state by a shaping bandwidth for said line when a plurality of said connections are simultaneously placed in the cell transfer state, thereby allocating cell shaping bandwidths to said respective connections in proportion to a shaping bandwidth desired to be ensured as the minimum.

5. A source terminal for transferring congestion notification cells as well as data cells to a destination terminal within the same connection through a connection preset within an asynchronous transfer mode network including at least one transit switching system, comprising:
shaping bandwidth control means for decreasing a cell shaping bandwidth when a congestion notification cell with a congestion notification bit set thereto, is received from said destination terminal or said transit switching system, and increasing the cell shaping bandwidth when a congestion notification cell with no congestion notification bit set thereto is received from said destination terminal or said transit switching system,
said shaping bandwidth control means including, means for dividing the shaping bandwidth for one line by the number of connections each placed in a cell transfer state over said line when a plurality of connections established over said one line are simultaneously placed in the cell transfer state, thereby uniformly allocating the cell shaping bandwidth to said each connection.

6. A source terminal for transferring congestion notification cells as well as data cells to a destination terminal through a connection preset within an asynchronous transfer mode network including at least one transit switching system, comprising:
shaping bandwidth control means for decreasing a cell shaping bandwidth when a congestion notification cell with a congestion notification bit set thereto is received from said destination terminal or said transit switching system, and increasing the cell shaping bandwidth when a congestion notification cell with no congestion notification bit set thereto is received from said destination terminal or said transit switching system,
said shaping bandwidth control means including,
memory means for storing therein information of minimum secured bandwidth value every connections; and
means for dividing a bandwidth obtained by subtracting the sum of minimum secured bandwidths for all the connections established over a line to which said connections are set, from a shaping bandwidth for said line by the number of the connections each placed in a cell transfer state over said line for each connection, and further adding the minimum secured bandwidths for the connection to the obtained result of division, thereby ensuring the minimum secured bandwidth for each connection and uniformly allocating the cell shaping bandwidths to said respective connections as the bandwidths freely allocable with said respective connections.

7. A source terminal for transferring data cells to a destination terminal through a connection preset within an asynchronous transfer mode network including at least one transit switching system, comprising:
memory means for storing therein priority information indicative of priorities for bandwidth allocation at cell transfers for each connection; and
shaping bandwidth calculating means for calculating each of cell shaping bandwidths proportional to the priority information when a plurality of connections established over one line are simultaneously placed in a cell transfer state, whereby the shaping bandwidths are allocated between all the connections each placed in the cell transfer state.

8. The source terminal according to claim 7, wherein shaping bandwidth calculating means for multiplying a ratio obtained by dividing priority information for said respective connections by the sum of the priority information for all connections each placed in the cell transfer state over said line by the shaping bandwidth for said line, thereby calculating each of cell shaping bandwidths proportional to the priority information for each connection is provided as an alternative to said shaping bandwidth calculating means.

9. A source terminal for transferring data cells to a destination terminal through a connection preset within an asynchronous transfer mode network including at least one transit switching system, comprising:
means for dividing, when a plurality of connections set on the same line are simultaneously placed in a cell transfer state, a shaping bandwidth for said line by the number of the connections each placed in the cell transfer state, thereby uniformly allocating cell shaping bandwidths to said respective connections.

10. A source terminal suitable for use in a packet transfer network, for transferring a variable-length packet to a destination terminal through one or a plurality of packet transit systems, comprising:

memory means for storing therein priority information indicative of priorities for bandwidth allocation at cell transfers every users; and shaping bandwidth calculating means for calculating each of packet shaping bandwidths, based on the priority information when a plurality of users are simultaneously placed in a packet transfer state,
whereby the shaping bandwidths are allocated to all the users each placed in the packet transfer state.

11. The source terminal according to claim 10, wherein said shaping bandwidth calculating means includes means for multiplying a ratio obtained by dividing the priority information for said respective users by the sum of the priority information for all the users placed in the packet transfer state, of users performing transmission to the same line as for said respective users by a shaping bandwidth for said line, thereby calculating each of packet shaping bandwidths proportional to the priority information for each user.

12. A cell communication system, comprising:

bandwidth allocating means for assigning minimum secured bandwidths to each individuals of a plurality of connections respectively; and surplus bandwidth allocating means for assigning surplus bandwidths subsequent to the assignment of the minimum secured bandwidths set to each individuals of said plurality of connections to said respective connections;

wherein said surplus bandwidth allocating means controls the allocation of the surplus bandwidths to each individuals of said plurality of connections according to parameters set to each individuals of said plurality of connections.

13. The cell communication system according to claim 12, wherein said surplus bandwidth allocating means includes means for controlling the assignment of the surplus bandwidths to said respective connections according to priority information indicative of priorities for bandwidth allocation at cell transfers, which are set to said respective connections.

14. The cell communication system according to claim 12, wherein said surplus bandwidth allocating means includes means for controlling the allocation of the surplus bandwidths to said respective connections according to a proportion of the minimum secured bandwidths set to said respective connections.

* * * * *